(12) United States Patent
Lee et al.

(10) Patent No.: US 12,418,437 B2
(45) Date of Patent: Sep. 16, 2025

(54) METHOD OF CONTROLLING PLURALITY OF ELECTRONIC DEVICES BASED ON CONTEXT OF USER, AND COMPUTING DEVICE FOR PERFORMING THE SAME

(71) Applicant: Samsung Electronics Co., Ltd., Suwon-si (KR)

(72) Inventors: Yongseok Lee, Suwon-si (KR); Sejin Kwak, Suwon-si (KR); Geunho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/425,234

(22) Filed: Jan. 29, 2024

(65) Prior Publication Data

US 2024/0243943 A1 Jul. 18, 2024

Related U.S. Application Data

(63) Continuation of application No. PCT/KR2024/000751, filed on Jan. 16, 2024.

(30) Foreign Application Priority Data

Jan. 17, 2023 (KR) ........................ 10-2023-0006997
Jun. 26, 2023 (KR) ........................ 10-2023-0082135

(51) Int. Cl.
*H04L 12/28* (2006.01)
*G06V 10/75* (2022.01)

(52) U.S. Cl.
CPC ............ *H04L 12/282* (2013.01); *G06V 10/75* (2022.01); *H04L 12/2823* (2013.01)

(58) Field of Classification Search
CPC .... G06V 10/75; H04L 12/282; H04L 12/2823
See application file for complete search history.

(56) References Cited

U.S. PATENT DOCUMENTS 10,916,244 B2   2/2021   Kim et al.
10,956,231 B2   3/2021   Shrivastava et al.
(Continued)

FOREIGN PATENT DOCUMENTS

KR         10-1349540 B1      1/2014
KR       10-2017-0047117 A    5/2017
(Continued)

OTHER PUBLICATIONS

International Search Report dated Apr. 18, 2024, issued in International Patent Application No. PCT/KR2024/000751.

*Primary Examiner* — Mohamed A. Wasel
(74) *Attorney, Agent, or Firm* — Jefferson IP Law, LLP

(57) ABSTRACT

A method performed by a computing device of controlling a plurality of electronic devices according to context of a user is provided. The method includes the computing device determining the context of the user, based on the determined context, selecting at least one modality to be considered when controlling the plurality of electronic devices, obtaining, for each selected modality, a score map indicating an area affected by input and output of the plurality of electronic devices, calculating a score for each selected modality by using the obtained score map, and controlling operations of the plurality of electronic devices based on the calculated score such that the score includes a value indicating a degree of optimization of user experience in the determined context.

20 Claims, 16 Drawing Sheets

(56) References Cited

U.S. PATENT DOCUMENTS

| | | | |
|---|---|---|---|
| 11,240,057 B2 * | 2/2022 | Mese | G06F 3/165 |
| 11,361,765 B2 | 6/2022 | Park | |
| 11,374,782 B2 | 6/2022 | Kang et al. | |
| 2019/0362377 A1 * | 11/2019 | Zavesky | G06Q 30/0242 |
| 2020/0229289 A1 * | 7/2020 | Cahill | H05B 47/12 |
| 2020/0244750 A1 | 7/2020 | Park et al. | |
| 2021/0011440 A1 * | 1/2021 | Marti | H04W 4/023 |
| 2021/0313079 A1 | 10/2021 | Samal et al. | |
| 2022/0022808 A1 | 1/2022 | Moros Ortiz et al. | |
| 2022/0093091 A1 * | 3/2022 | Kwatra | G10L 25/63 |

FOREIGN PATENT DOCUMENTS

| | | |
|---|---|---|
| KR | 10-1745311 B1 | 6/2017 |
| KR | 10-2017-0075545 A | 7/2017 |
| KR | 10-1770156 B1 | 8/2017 |
| KR | 10-2020124 B1 | 11/2019 |
| KR | 10-2074259 B1 | 2/2020 |
| KR | 10-2367109 B1 | 2/2022 |
| KR | 10-2398390 B1 | 5/2022 |
| KR | 10-2717140 B1 | 10/2024 |
| WO | 2020/213767 A1 | 10/2020 |
| WO | 2022/219734 A1 | 10/2022 |

* cited by examiner

METHOD OF CONTROLLING PLURALITY OF ELECTRONIC DEVICES BASED ON CONTEXT OF USER, AND COMPUTING DEVICE FOR PERFORMING THE SAME

CROSS-REFERENCE TO RELATED APPLICATION(S)

This application is a continuation application, claiming priority under § 365(c), of an International application No. PCT/KR2024/000751, filed on Jan. 16, 2024, which is based on and claims the benefit of a Korean patent application number 10-2023-0006997, filed on Jan. 17, 2023, in the Korean Intellectual Property Office, and of a Korean patent application number 10-2023-0082135, filed on Jun. 26, 2023, in the Korean Intellectual Property Office, the disclosure of each of which is incorporated by reference herein in its entirety.

TECHNICAL FIELD

The disclosure relates to a method of controlling a plurality of electronic devices based on context of a user, and a computing system for performing the method.

BACKGROUND ART

Recently, types of electronic devices (home appliances) used in homes and offices have diversified. In addition, the scope of application of Internet of Things (IoT) technology, which controls electronic devices by using information collected from electronic devices, has also expanded.

When controlling a plurality of electronic devices, an IoT server may perform control based on a status and function of each of the electronic devices. However, in a situation where a plurality of electronic devices operate within a certain space, when the IoT server controls each of the electronic devices independently without considering the overall situation, the electronic devices may not interact with each other smoothly, or the quality of user experience using the electronic devices may deteriorate.

The above information is presented as background information only to assist with an understanding of the disclosure. No determination has been made, and no assertion is made, as to whether any of the above might be applicable as prior art with regard to the disclosure.

DISCLOSURE

Aspects of the disclosure are to address at least the above-mentioned problems and/or disadvantages and to provide at least the advantages described below. Accordingly, an aspect of the disclosure is to provide a method of controlling a plurality of electronic devices based on context of a user, and a computing system for performing the method.

Additional aspects will be set forth in part in the description which follows and, in part, will be apparent from the description, or may be learned by practice of the presented embodiments.

Technical Solution

In accordance with an aspect of the disclosure, a method of controlling a plurality of electronic devices according to context of a user is provided. The method includes determining, by a computing device, context of the user, selecting, by the computing device based on the determined context, at least one modality to be considered when controlling the plurality of electronic devices, obtaining, by the computing device for each selected modality, a score map indicating an area affected by input and output of the plurality of electronic devices, calculating, by the computing device, a score for each selected modality by using the obtained score map, and controlling, by the computing device, operations of the plurality of electronic devices based on the calculated score, wherein the score includes a value indicating a degree of optimization of user experience in the determined context.

In accordance with another aspect of the disclosure, a computing device is provided. The computing device includes a communication interface configured to perform communication with a plurality of electronic devices, memory configured to store a program for controlling the plurality of electronic devices according to context of a user, and at least one processor, wherein the at least one processor is configured to execute the program to determine the context of the user, select, based on the determined context, at least one modality to be considered when controlling the plurality of electronic devices, obtain, for each selected modality, a score map indicating an area affected by input and output of the plurality of electronic devices, calculate a score for each selected modality by using the obtained score map, and then control operations of the plurality of electronic devices based on the calculated score, and the score includes a value indicating a degree of optimization of user experience in the determined context.

In accordance with an aspect of the disclosure, one or more non-transitory computer-readable storage media storing computer-executable instructions that, when executed by one or more processors of a computing device, cause the computing device to perform operations are provided. The operations include determining, by the computing device, context of the user, selecting, by the computing device based on the determined context, at least one modality to be considered when controlling the plurality of electronic devices, obtaining, by the computing device for each selected modality, a score map indicating an area affected by input and output of the plurality of electronic devices, calculating, by the computing device, a score for each selected modality by using the obtained score map, and controlling, by the computing device, operations of the plurality of electronic devices based on the calculated score, wherein the score is a value indicating a degree of optimization of user experience in the determined context.

According to an aspect of the disclosure, the program is stored in the computer-readable recording medium so as to perform, on a computer, at least one of the disclosed embodiments of the method.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE

Mode for Invention

Figure 1:
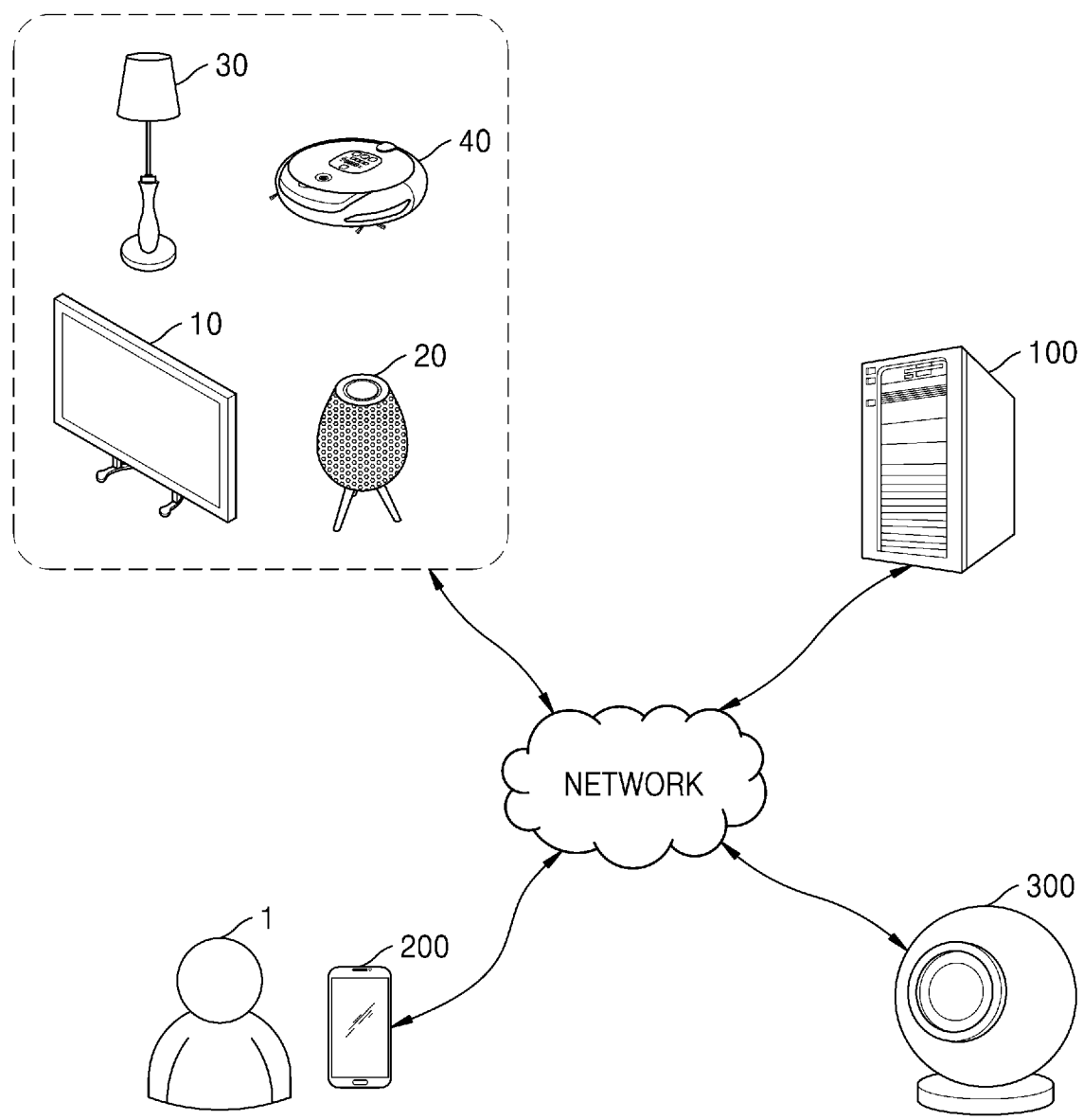
FIG. 1 is a diagram illustrating a system environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP), a communication processor (CP), a graphical processing unit (GPU), a neural processing unit (NPU), a microprocessor unit (MPU), a system on chip (SoC), an IC, or the like.

Throughout the disclosure, the expression "at least one of a, b, or c" indicates only a, only b, only c, both a and b, both a and c, both b and c, all of a, b, and c, or variations thereof.

In the following description of the disclosure, descriptions of techniques that are well known in the art and not directly related to the disclosure are omitted. This is to clearly convey the gist of the disclosure by omitting an unnecessary explanation. The terms used in the following description are defined based on functions used in the disclosure, and can be changed according to the intent or commonly used methods of users or operators. Accordingly, definitions of the terms are understood based on the entire descriptions of the present specification.

For the same reasons, some components may be exaggerated, omitted, or schematically illustrated in drawings for clarity. In addition, the size of each element does not entirely reflect the actual size. The same reference numerals are assigned to the same or corresponding elements in the drawings.

The advantages and features of the disclosure and methods of achieving them will become apparent with reference to embodiments described below with reference to the accompanying drawings. However, the disclosure is not limited to embodiments disclosed below and may be implemented in various different forms. The disclosed embodiments are provided to ensure that the disclosure is complete and to fully inform one of ordinary skill in the art of the disclosure of the scope of the disclosure. An embodiment of the disclosure may be defined according to the claims. Throughout the specification, the same elements are denoted by the same reference numerals. In the description of an embodiment of the disclosure, when it is determined that a detailed description of related functions or configurations may unnecessarily obscure the subject matter of the disclosure, the detailed description thereof will be omitted. The terms used in the specification are defined based on functions used in the disclosure, and can be changed according to the intent or commonly used methods of users or operators. Accordingly, definitions of the terms are understood based on the entire descriptions of the present specification.

In an embodiment of the disclosure, combinations of each of blocks of flowcharts and the flowcharts may be performed by computer program instructions. The computer program instructions may be loaded into a processor of a general-purpose computer, special purpose computer, or other programmable data processing device, and the instructions, which are executed via the processor of the computer or other programmable data processing device, may generate means for implementing functions specified in the flowchart block(s). The computer program instructions may also be stored in a computer usable or computer-readable memory that may direct a computer or other programmable data processing device to function in a particular manner, and the instructions stored in the computer usable or computer-readable memory may produce an article of manufacture including instruction means that implement the functions specified in the flowchart block(s). The computer program instructions may also be mounted on a computer or other programmable data processing equipment.

In addition, each block of the flowchart may represent a module, segment, or portion of code, which includes one or more executable instructions for performing specified logical function(s). In an embodiment of the disclosure, functions mentioned in blocks may occur out of order. For example, two blocks illustrated in succession may be executed substantially concurrently, or may sometimes be executed in a reverse order, depending on the functions.

The term "unit" used in an embodiment of the disclosure refers to a software or hardware component, such as a field-programmable gate array (FPGA) or application-specific integrated circuit (ASIC), which performs certain tasks. However, the term "unit" is not limited to software or hardware. The term "unit" may be configured in an addressable storage medium or may be configured to reproduce one or more processors. In an embodiment of the disclosure, the term "unit" may refer to components, such as software components, object-oriented software components, class components, and task components, and may include processes, functions, attributes, procedures, subroutines, segments of program code, drivers, firmware, micro codes, circuits, data, a database, data structures, tables, arrays, or variables. Functions provided through specific elements or specific "units" may be coupled to reduce the number thereof or separated into additional elements. In addition, in an embodiment of the disclosure, the "unit" may include at least one processor.

Before describing specific embodiments of the disclosure, the meaning of terms frequently used in the present specification are defined.

"Context" refers to situation information determined based on user's activity and an operation status of an electronic device in embodiments of the disclosure. According to embodiments of the disclosure, the user may act with an intention in an environment where a plurality of electronic devices are used, and context corresponding to the user's intention may be determined based on the user's activity and the operation status of the electronic device. For example, when the user is sitting in a front area of a television (TV) and the TV is turned on, the context may be determined as "watching TV", but when the TV is turned off, the context may be determined as "idle", even when the user is sitting in the front area of the TV. In addition, various types of contexts may be determined according to the user's intention.

"Modality" may include a type of input/output used when an electronic device interacts with a user. In addition, the modality may include senses necessary when the user uses an electronic device. According to an embodiment of the disclosure, modality may include visual modality, auditory modality, or the like. In addition, various other types of modalities may be used. For example, the visual modality of an electronic device may include data output through a display or data input through a camera, and the auditory modality of an electronic device may include data output through a speaker or data input through a microphone. The user may use the visual modality when detecting data output to the display, and may use the auditory modality when detecting data output through the speaker. In addition, the user may input user's voice to the electronic device through the microphone, and at this time, the user's voice may be included in the auditory modality.

In embodiments of the disclosure, "kernel" is used as a term to mean a range in which an input and output of an electronic device is affected or a range in which the user's senses operate. The kernel is defined as a size and location of an area and may include an input kernel and an output kernel.

The "input kernel" may refer to a range of an area in which an input of a user or electronic device is affected. For example, a range of an area in which the user may hear sound may correspond to an input kernel of the user for the auditory modality. In addition, for example, a range of an area in which an electronic device may receive a voice input may correspond to an input kernel of the electronic device for the auditory modality.

The "output kernel" may refer to a range of an area affected by an output of a user or electronic device. For example, a range of an area in which images output from a TV may be viewed may correspond to the output kernel of the TV for the visual modality.

The input/output kernel may vary depending on the characteristics of the electronic device, and even for the same electronic device, the input/output kernel may vary depending on the context or modality. In embodiments of the disclosure, input/output kernels of electronic devices are displayed on a map, and the maps on which the input/output kernels are displayed may be used when controlling the electronic devices.

"Score map" refers to a map on which input/output kernels of electronic devices are displayed, and may be used to calculate scores according to the context of the user. In other words, the score map may correspond to a map showing an area affected by an input and output of electronic devices for each modality. At this time, "score" refers to a value quantitatively represents a degree of optimization of the user experience in a certain context. According to an embodiment of the disclosure, the higher the score calculated in a certain context, the higher the level of experience provided to the user. A specific method of calculating a score by using a score map is described through specific embodiments below.

Embodiments of the disclosure present a method of controlling a plurality of electronic devices to provide an optimal experience to the user according to the context of the user. First, general rules commonly applied to embodiments of the disclosure are described, and then specific embodiments are described with reference to the drawings.

FIG. 1 is a diagram illustrating a system environment according to an embodiment of the disclosure. Referring to FIG. 1, a plurality of electronic devices 10, 20, 30, and 40 may be used in a space in which a user 1 is located, and the plurality of electronic devices 10, 20, 30, and 40 may be connected to a server 100 through a server 100. The server 100 may control operations of the plurality of electronic devices 10, 20, 30, and 40 according to context of the user 1. According to an embodiment of the disclosure, the server 100 may be an Internet of Things (IOT) server for controlling electronic devices in a home or office.

A mobile terminal 200 of the user 1 may be connected to the server 100 and used in a process of controlling the electronic devices 10, 20, 30, and 40. In addition, according to an embodiment of the disclosure, a camera 300 capable of photographing the user 1 and the electronic devices 10, 20, 30, and 40 may be connected to the server 100 and to transmit a captured image to the server 100. Types of the electronic devices 10, 20, 30, and 40 controlled by the server 100 are not limited to those shown in FIG. 1, and may be more diverse.

1. Description of General Rules Applicable to Embodiments of the Disclosure

In embodiments of the disclosure, the server 100 may determine context of the user 1, and control the electronic devices 10, 20, 30, and 40 according to the determined context. The server 100 may control the operations of the electronic devices 10, 20, 30, and 40 in a way that may provide the user 1 with an optimal experience. To this end, the server 100 may calculate a score based on a map, and perform control based on the calculated score. Operations in which the server 100 performs control are described below.

(1) Determine Context of the User

As described above, context may be determined according to the intention of the user 1. Accordingly, the server 100 may identify the intention of the user 1 through various means and determine the context accordingly. According to an embodiment of the disclosure, the server 100 may recognize at least one of the activity or location of the user 1, and determine context of the user 1 based on the recognition. Below, several embodiments in which the server 100 determines the context of the user 1 are described.

1) Analyze a Captured Video and Determine the Context

According to an embodiment of the disclosure, the camera 300 may transmit an image of the user 1 and the electronic devices 10, 20, 30, and 40 to the server 100, and the server 100 may analyze the image captured by the camera 300 and determine the context of the user 1. The server 100 may not only identify the locations of the user 1 and the electronic devices 10, 20, 30, and 40 from the captured image, but not also identify operations being performed by the user 1 and the electronic devices 10, 20, 30, and 40 from the captured image. (e.g., when a robot cleaner 40 is moving in the image, the server 100 may determine that the robot cleaner 40 is performing a cleaning operation)

Accordingly, the server 100 may determine the context of the user 1 based on the location and operation performed by each of the user 1 and the electronic devices 10, 20, 30, and 40. For example, when the user 1 is holding a book around a light 30, the server 100 may determine that the context is "reading". In addition, for example, when the user is moving with a vacuum cleaner, the server 100 may determine that the context is "housework" or "cleaning".

2) Determine the Context Based on Information about an Operation Status Received from Electronic Devices According to an embodiment of the disclosure, the server 100 may receive information about the operation status (e.g., the TV is turned on, the artificial intelligence (AI) speaker receives a voice input, or the like) from the electronic devices 10, 20, 30, and 40 through wired and wireless communication, and determine the context based on the received information about the operation status. For example, when all electronic devices 10, 20, 30, and 40 are turned off or not in operation, the server 100 may determine that the context is "sleeping". In addition, for example, when the only the light 30 is turned on and all other electronic devices are not in operation, the server 100 may determine that the context is "idle".

According to an embodiment of the disclosure, the server 100 may determine the context by using the image captured by the camera 300 and the information about the operation status of the electronic devices 10, 20, 30, and 40 together. For example, when the user 1 is located within a certain distance from the TV 10, a facing direction of the user 1 is facing the TV 10, and the TV 10 is turned on, the server 100 may determine that the context is "watching TV". In addition, for example, when the user 1 is located within a certain distance from the AI speaker 20 and the AI speaker 20 is receiving a voice input, the server 100 may determine that the context is "communicating with AI speaker".

3) Determine the Context by Using a Neural Network

The server 100 may determine the context of the user 1 by using a neural network. According to an embodiment of the disclosure, a neural network may be trained by using data for training labeling the image of the user 1 and the electronic devices 10, 20, 30, and 40 with the corresponding context, and the server 100 may infer the context corresponding to the captured image by using the trained neural network.

4) Identify (Determine) the Context According to a User's Selection

The context of the user 1 may also be determined by selection of the user 1. According to an embodiment of the disclosure, the user 1 may access the server 100 through the mobile terminal 200 to select the context. For example, the user 1 may select any one of various modes, such as "TV watching mode", "idle mode", and "sleeping mode", and the server 100 may determine the context according to the mode selected by the user 1.

(2) Calculate a Score According to the Context

As described above, in embodiments of the disclosure, "score" may be a value indicating a degree of optimization of the user experience in any context. Accordingly, even when the operations of the electronic devices 10, 20, 30, and 40 are the same, the impact on the score may vary depending on the context. For example, when the context is "watching TV", the TV 10 being turned on may contribute to increasing the score, but when the context is "idle", the TV 10 being turned on may contribute to lowering the score. Accordingly, the server 100 may calculate the score according to the context of the user 1.

1) Select at Least One Modality According to the Context

According to an embodiment of the disclosure, the score may be calculated for each modality, and a type of modality that must be when controlling the electronic devices 10, 20, 30, and 40 may vary depending on the context. Accordingly, when the context is determined, the server 100 may determine which modality to calculate the score for.

For example, when controlling the electronic devices 10, 20, 30, and 40, the server 100 must consider visual modality and auditory modality when the context is "watching TV", but when the context is "communicating with AI speaker", only auditory modality may be considered. Accordingly, according to an embodiment of the disclosure, the server 100 may select at least one modality according to the context, and to this end, information about a type of modality corresponding to each context may be stored in advance in the server 100.

2) Obtain a Score Map for Each Selected Modality

When at least one modality is selected according to the context, the server 100 may obtain a score map for each selected modality. According to an embodiment of the disclosure, the server 100 may generate a score map by displaying the locations of the user 1 and the electronic devices 10, 20, 30, and 40 on the map (e.g., a basic map of the space in which the user and the electronic devices are located) and displaying an input/output kernel for each of the user 1 and the electronic devices 10, 20, 30, and 40. In this case, the input/output kernels of the electronic devices 10, 20, 30, and 40 may be determined according to input/output characteristics of the electronic devices 10, 20, 30, and 40 related to each modality. For example, when generating a score map for visual modality, the server 100 may display, on the score map, output kernels of electronic devices that affect the visual field of the user 1.

According to an embodiment of the disclosure, the score map may be a map in the form including a two-dimensional grid, and in this case, a size of each grid may be set to be proportional to a location measurement resolution of the server 100.

According to an embodiment of the disclosure, the score map may include a plurality of layers, and locations of electronic devices that do not move frequently (e.g., TV, washing machine, or the like) may be displayed in advance in some layers.

According to an embodiment of the disclosure, the server 100 may obtain a score map corresponding to modality selected according to the context by extracting a score map from the entire score map. The entire score map may be a map showing all areas affected by an input and output of the electronic devices 10, 20, 30, and 40 for a plurality of modalities. The server 100 may generate and store the entire score map in advance.

When generating a score map, the locations of the electronic devices 10, 20, 30, and 40 and the location of the user 1 may be measured by various methods. For example, as described above, the server 100 may measure the locations of the user 1 and the electronic devices 10, 20, 30, and 40 from the image captured by the camera 300 and display the measured locations on the score map. Alternatively, for example, the server 100 may measure locations by using a positioning technology using wireless communication (e.g., Bluetooth, ultra-wideband (UWB), or the like) between the electronic devices 10, 20, 30, and 40 and the mobile terminal 200.

The server 100 may set at least one of an input kernel or an output kernel for the user 1 and the electronic devices 10, 20, 30, and 40, and display the set kernel on the score map. Alternatively, the server 100 may not set either the input kernel or the output kernel for the user 1 and some of the electronic devices 10, 20, 30, and 40. For example, the server 100 may not set an output kernel for electronic devices that do not affect the modality corresponding to the score map. (e.g., when generating a score map for visual modality, an output kernel is not set for a washing machine operating at a fixed location)

According to an embodiment of the disclosure, the output kernel may be divided into a kernel with positive characteristics and a kernel with negative characteristics, and the characteristics of the output kernel may be determined according to whether the output is a subject of attention. For example, when the context is "watching TV", an area in which an operation noise of the robot cleaner 40 is heard may correspond to an output kernel with negative characteristics for auditory modality. In addition, for example, when the context is "communicating with AI speaker", an area in which a voice input of the AI speaker 20 is heard may correspond to an output kernel with positive characteristics for auditory modality.

Even the output of the same electronic devices may be the output of interest or noise depending on the context. Accordingly, the characteristics of the output kernel may be determined according to the context. Kernels with positive characteristics may have a positive effect on score calculation, and kernels with negative characteristics may have a negative impact on score calculation.

According to an embodiment of the disclosure, the input/output kernel may be divided into a plurality of levels according to the degree to which an input is affected or the degree to which an output affects. For example, when setting an output kernel for auditory modality for an electronic device that outputs a sound, an area up to a certain distance from the electronic device may be set to a high level output kernel, and an area farther than the certain distance may be set a low level output kernel.

According to an embodiment of the disclosure, the server 100 may set an input/output kernel based on input/output characteristics of the electronic device (e.g., a size of operation noise, a viewing angle of the image, or the like). Depending on the type of the electronic device, a default value of the input/output characteristics may be predetermined (e.g., a default value of the operating noise level of the washing machine, a default value of the operating noise level of the vacuum cleaner, or the like), and the server 100 may set an input/output kernel of the electronic device according to the predetermined default value.

According to an embodiment of the disclosure, the server 100 may correct the input/output characteristics of an electronic device by using capability information provided by the manufacturer of the electronic device or by using other nearby electronic devices (e.g., through analysis of images captured through a camera or through analysis of sound received by using a microphone), and correct the input/output kernel accordingly.

In addition, according to an embodiment of the disclosure, the server 100 may set or correct the input/output kernel based on the information about the operation status (e.g., brightness of a light, volume of a speaker, or the like) received from the electronic devices 10, 20, 30, and 40. As described above, the server 100 may set the input/output kernel according to the type of the electronic device and correct the input/output kernel when necessary.

For example, the server 100 may obtain capability information or information about an operation status from the electronic devices 10, 20, 30, and 40, and change at least one of a size or a shape of an input kernel or output kernel based on the obtained capability information or information about the operation status.

According to an embodiment of the disclosure, the server 100 may set a range of an area that may be recognized by the user for the modality corresponding to the score map as the input kernel for the user 1. For example, when generating a score map for auditory modality, an area in which the user 1 may hear sound may be set as the input kernel for the user 1.

According to an embodiment of the disclosure, the server 100 may generate the score map by dividing a space in which the electronic devices 10, 20, 30, and 40 is located into a plurality of areas, mapping each of the electronic devices 10, 20, 30, and 40 to at least one of the plurality of areas, and reflecting the input/output characteristics of the electronic devices 10, 20, 30, and 40 in the mapped area and displaying the input/output kernel.

As discussed above, the input/output kernel set for each of the user 1 and the electronic devices 10, 20, 30, and 40 may be determined according to the context, modality, and input/output characteristics of the electronic device. For example, when the context is "watching TV" and a score map for visual modality is to be generated, an area in which the image of the TV 10 may be viewed may be set as an output kernel (output kernel with positive characteristics) for the TV 10. In addition, for example, when the context is "idle" and a score map for auditory modality is to be generated, an area in which the operating noise of the robot cleaner 40 is heard may be set as an output kernel (output kernel with negative characteristics) for the robot cleaner 40.

3) Calculate a Score for Each Modality Based on the Score Map

When a score map is generated for each modality, the server 100 may calculate a score for each modality by using the score map.

According to an embodiment of the disclosure, the server 100 may calculate the score based on an area of an input/output kernel displayed on the score map. For example, the server 100 may calculate the score by calculating an area of a region in which an input kernel and an output kernel included in the score map overlap and adding or subtracting an area corresponding to the output kernel (the area of the overlapping area) according to the characteristics (positive or negative) of the output kernel. In other words, the score may be obtained by adding an area of a region in which the output kernel with positive characteristics overlaps the input kernel and subtracting an area of a region in which the output kernel with negative characteristics overlaps the input kernel. In this case, the impact on the score may vary depending on the level of the input/output kernel. For example, even when the overlapping area of the input kernel and the output kernel is the same, the higher the level of the output kernel, the greater the impact on the score.

According to an embodiment of the disclosure, the server 100 may calculate the score by performing a convolution operation on the input kernel and the output kernel included in the score map. For example, the server 100 may assign a score to each input/output kernel according to a level thereof (e.g., when the score map includes a two-dimensional grid, 2 points are assigned to each of grids included in a high-level output kernel, and 1 point is assigned to grids included in a low-level output kernel), and perform a convolution operation on all output kernels for each input kernel, to calculate the score.

A detailed description of how the server 100 calculates a score through convolution operation is provided below.

According to an embodiment of the disclosure, a score map may be expressed as a two-dimensional grid. In a score map, a space may include a plurality of cells, and each of the cells may be expressed as coordinates (i, j). The server 100 may calculate a total score (score by modality) corresponding to each of the cells by performing a convolution operation.

When the input kernel of the user 1 is expressed as $I_u(i, j)$, the output kernel of any electronic device is expressed as $O_u(i, j, a_d)$, and a plurality of electronic devices $d_1, d_2, \ldots, d_N$ are present within the space, the server 100 may calculate a score $S_m$ for a specific modality through Equation 1 below.

$$S_m = \sum_{i,j \in I_u} \sum_{d \in \{d_1, d_2, \ldots, d_N\}} I_u(i,j) * O_d(i, j, a_d) \quad \text{Equation 1}$$

In this case, $a_d$ is an action of any electronic device and may refer to an operation mode or operation status of any electronic device. $O_d(i, j, a_d)$ indicates a kernel value corresponding to a cell at coordinates (i, j) among the output kernels of any electronic devices, and this value may vary depending on $a_d$. The kernel value is a score assigned to the kernel on a cell basis. The higher the level of the kernel, the higher the kernel value may be given to the cell.

In the case of certain types of electronic devices, a location of the output kernel, that is, an area in which the output kernel is displayed, may change depending on the action $a_d$. (For example, in the case of the robot cleaner 40, the action $a_d$ may include a movement direction and speed of the robot cleaner 40, and accordingly, a size and location of an area in which an output kernel of the robot cleaner 40 is displayed, or the like, may change.)

In summary, the score Sm for a specific modality is a total of results of multiplying all cells included in the input kernel of the user 1 by a kernel value of an output kernel of each of the electronic devices d1, d2, . . . , $d_N$. A method of controlling an operation of the electronic devices d1, d2, . . . , $d_N$ based on the score $S_m$ calculated in this way is described below.

(3) Control the Operation of the Electronic Devices Based on the Calculated Score When a score is calculated for each modality, the server 100 may control the operation of the electronic devices 10, 20, 30, and 40 based on the calculated score.

According to an embodiment of the disclosure, the server 100 may control the electronic devices 10, 20, 30, and 40 to maximize the score for each modality.

According to an embodiment of the disclosure, the server 100 may add up the scores for each modality and control the electronic devices 10, 20, 30, and 40 to maximize the result. When adding up the scores for each modality, the server 100 may apply a weight to the scores for each modality.

According to an embodiment of the disclosure, the weight may be determined according to the context. For example, when the context is "idle", a higher weight may be given to the score for auditory modality than the score for visual modality.

According to an embodiment of the disclosure, the weight may be determined settings of the user 1. For example, when the user 1 selects a mode that prioritizes video over sound when watching TV, a higher weight may be given to the score for visual modality than the score for auditory modality when the context is "watching TV".

A method by which the server 100 controls the electronic devices 10, 20, 30, and 40 based on the score is described below.

1) Control the Operation of Electronic Devices in a Way that Increases the Score from the Current Level According to an embodiment of the disclosure, the server 100 may control the operation of the electronic devices 10, 20, 30, and 40 in a way to increase the score for each modality from the current level. For example, when it is desired to increase the score for auditory modality, the server 100 may allow some electronic devices to operate in a low noise mode or stop the operation of some electronic devices.

In addition, according to an embodiment of the disclosure, the server 100 may control the operation of the electronic devices 10, 20, 30, and 40 in a way to increase the sum of the scores for each modality (simple sum or sum reflecting the weight) from the current level.

2) Predict a Score after a Certain Period of Time and Control the Operation of the Electronic Devices in a Way that the Expected Score Increases According to an embodiment of the disclosure, the server 100 may predict the score after a certain period of time based on a current situation (user's location and activity, operation status of electronic devices, or the like), and control the operation of the electronic devices 10, 20, 30, and 40 in a way in which the expected score increases.

For example, when a current movement direction of the robot cleaner 40 is a direction that will enter the field of view of the user 1 after a while, the score for visual modality may be lowered due to the operation of the robot cleaner 40, and thus, the server 100 may change the movement direction of the robot cleaner 40 to a direction away from the field of view of the user 1.

3) Establish an Optimal Operation Plan Through Iterative Optimization, and Corresponding Control According to an embodiment of the disclosure, the server 100 may identify the operation of the electronic devices 10, 20, 30, and 40 to maximize the score by applying an iterative optimization technique to the score map for each modality, and establish an optimal operation plan, and control the electronic devices 10, 20, 30, and 40 to operate according to the plan. For example, the server 100 may design a cost function of which the value decreases as the score calculated from the score map increases, and control the electronic devices 10, 20, 30, and 40 to minimize the value of the cost function.

As described above, when the score $S_m$ for a specific modality is calculated through a convolution operation, a method by which the server 100 controls the operation of the electronic devices $d_1, d_2, \ldots, d_N$ based on the score Sm is described below.

According to an embodiment of the disclosure, the server 100 may schedule the action $a_d$ of the electronic devices $d_1, d_2, \ldots, d_N$ for a target time range T (e.g., 60 seconds) through a cost function expressed in Equation 2 below.

$$\operatorname{argmax} \sum\nolimits_{(t=O \sim T)} S_m(a_{d_1}(t), a_{d_2}(t), \ldots, a_{d_N}(t)) \quad \text{Equation 2}$$

As can be understood from Equation 2, a cost that the server 100 must maximize within the target time range T is equal to the sum of the scores $S_m$ for each time t. In other words, the server 100 may optimize the experience of the user 1 by scheduling the action $a_d$ of the electronic devices $d_1, d_2, \ldots, d_N$ to maximize the sum of the scores $S_m$ for each time t within the target time range T. In this case, the score $S_m$ may be determined by the action $a_d$ of each of the electronic devices. Accordingly, in order to proceed with optimization (maximization of the cost function), the server 100 may obtain a gradient of the score $S_m$ for the action $a_d$ of each electronic device and apply a gradient descent, to determine the action $a_d$ of each electronic device in a way to increase the score $S_m$. The server 100 may iterate this process to schedule the action $a_d$ of the electronic devices $d_1, d_2, \ldots, d_N$.

Hereinafter, how the general rules described above are applied to specific embodiments is described with reference to the drawings. FIGS. 2, 3, 4, 5, and 6 are diagrams for describing a first embodiment (when the context is "watching TV") according to various embodiments of the disclosure. FIGS. 7, 8, 9, 10, and 11 are diagrams for describing a second embodiment (when the context is "communicating with AI speaker") according to various embodiments of the disclosure.

2. Description of the First Embodiment (when the Context is "Watching TV)

(1) (First Embodiment) Determine the Context of the User

First, the server 100 may determine the context of the user 1. The server 100 may determine the context of the user 1 according to various methods, and FIG. 2 shows one embodiment thereof.

Figure 2:
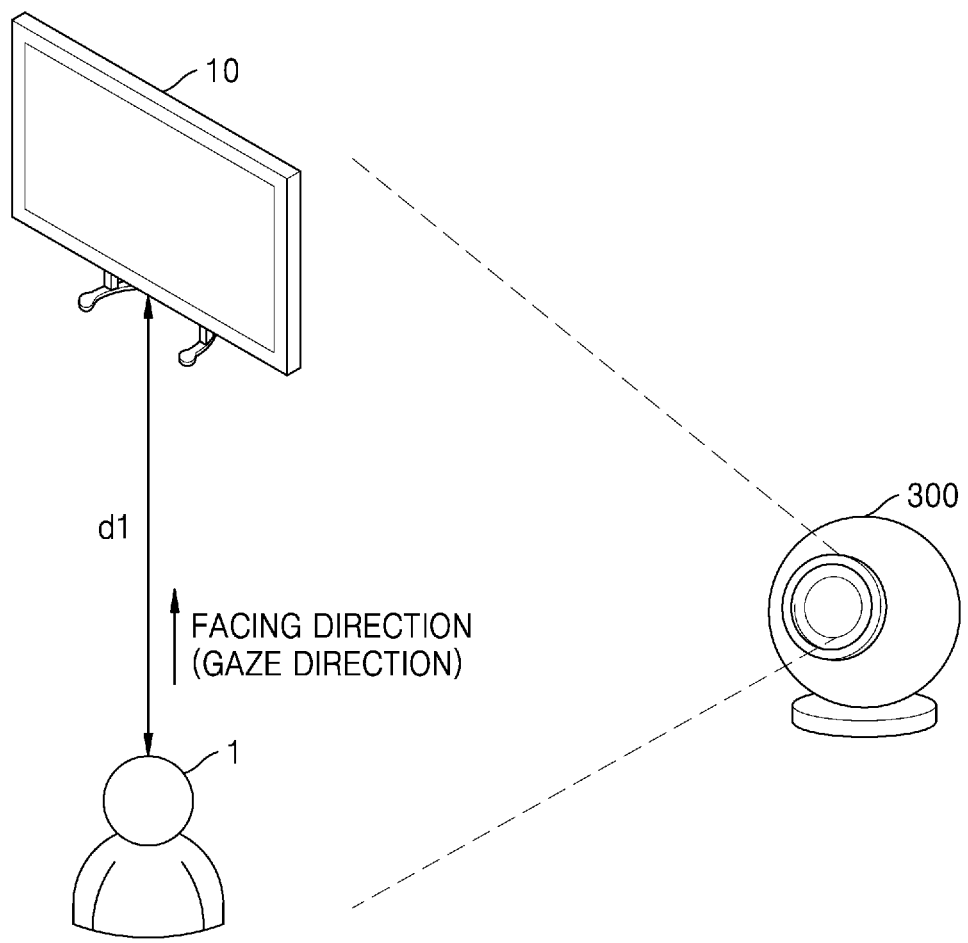
FIGS. 2, 3, 4, 5, and 6 are diagrams illustrating a first embodiment (a case where context is "watching TV") according to various embodiments of the disclosure.

Referring to FIG. 2, the camera 300 may photograph the user 1 and the TV 10, and transmit the captured image to the server 100. The server 100 may analyze the received captured image to identify locations of the user 1 and the TV 10 and a motion of the user 1.

In the embodiment shown in FIG. 2, when a distance d1 between the user 1 and the TV 10 is a preset reference value (e.g., 3 meters) or less and a facing direction (gaze direction) of the user 1 faces the TV 10 (e.g., when an angle formed by the facing direction of the user 1 and the straight line connecting the user 1 with the TV 10 is the preset reference value or less), the server 100 may determine that the context of the user 1 is "watching TV".

According to an embodiment of the disclosure, the server 100 may receive information about an operation status (e.g., turned on) from the TV 10, and determine the context of the user 1 by considering the information together with the captured image received from the camera 300.

According to an embodiment of the disclosure, the server 100 may apply the captured image received from the camera 300 to a pre-trained neural network as an input, and determine the inference result of the neural network as the context of the user 1.

(2) (First Embodiment) Calculate a Score According to the Context

The server 100 may generate a score map according to the determined context (watching TV), and calculate a score by using the score map.

1) (First Embodiment) Select at Least One Modality According to the Context

Because the determined context is "watching TV", the server 100 may select visual modality and auditory modality. Information indicating that the modalities corresponding to "watching TV" are visual and auditory modalities may be pre-stored in the server 100. The server 100 may calculate a score for the selected modality.

Figure 3:
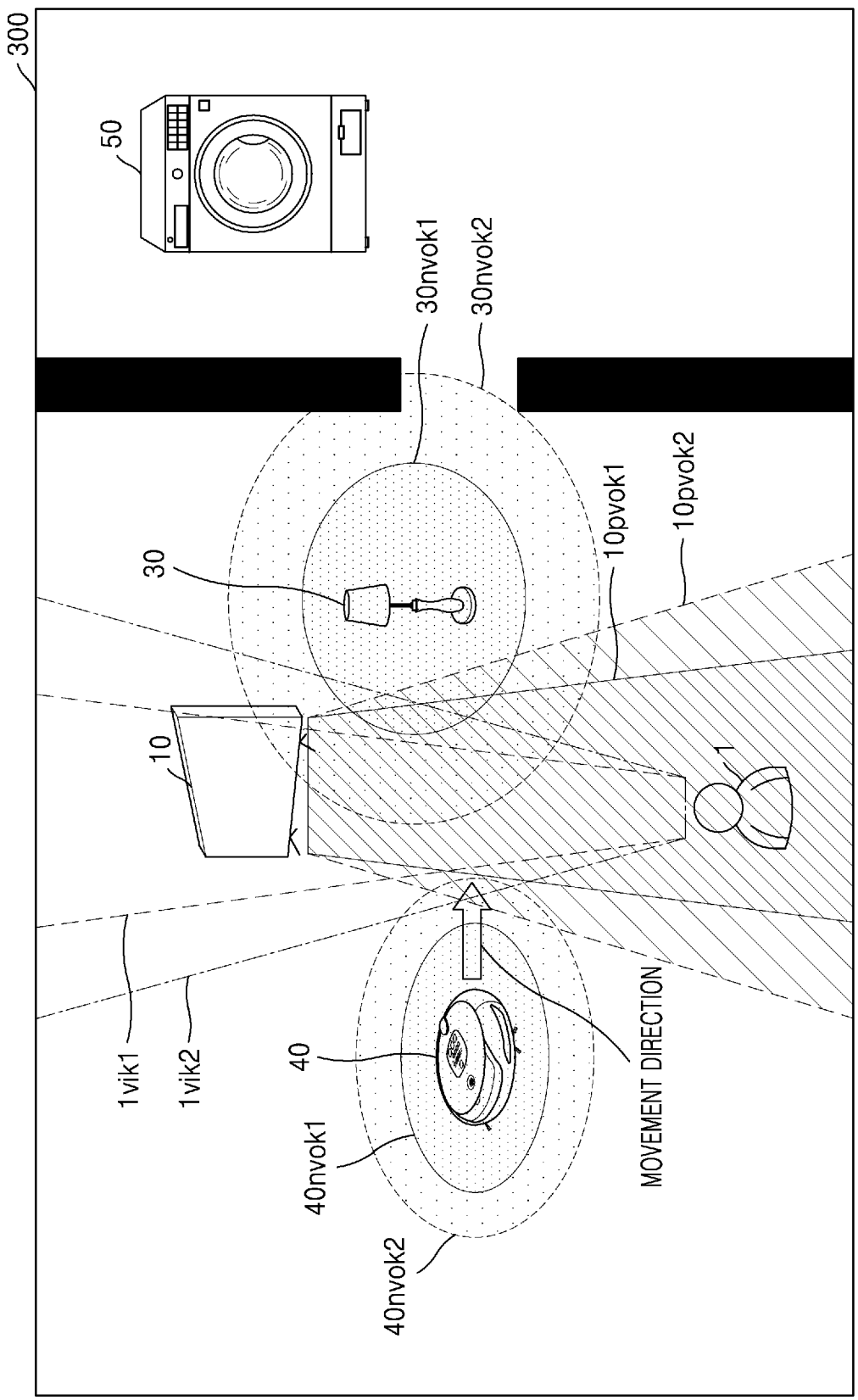

2) (First Embodiment) Generate a Score Map for Each Selected Modality 2-1) (First Embodiment) Generate a Score Map for Visual Modality (FIG. 3)

Figure 4:
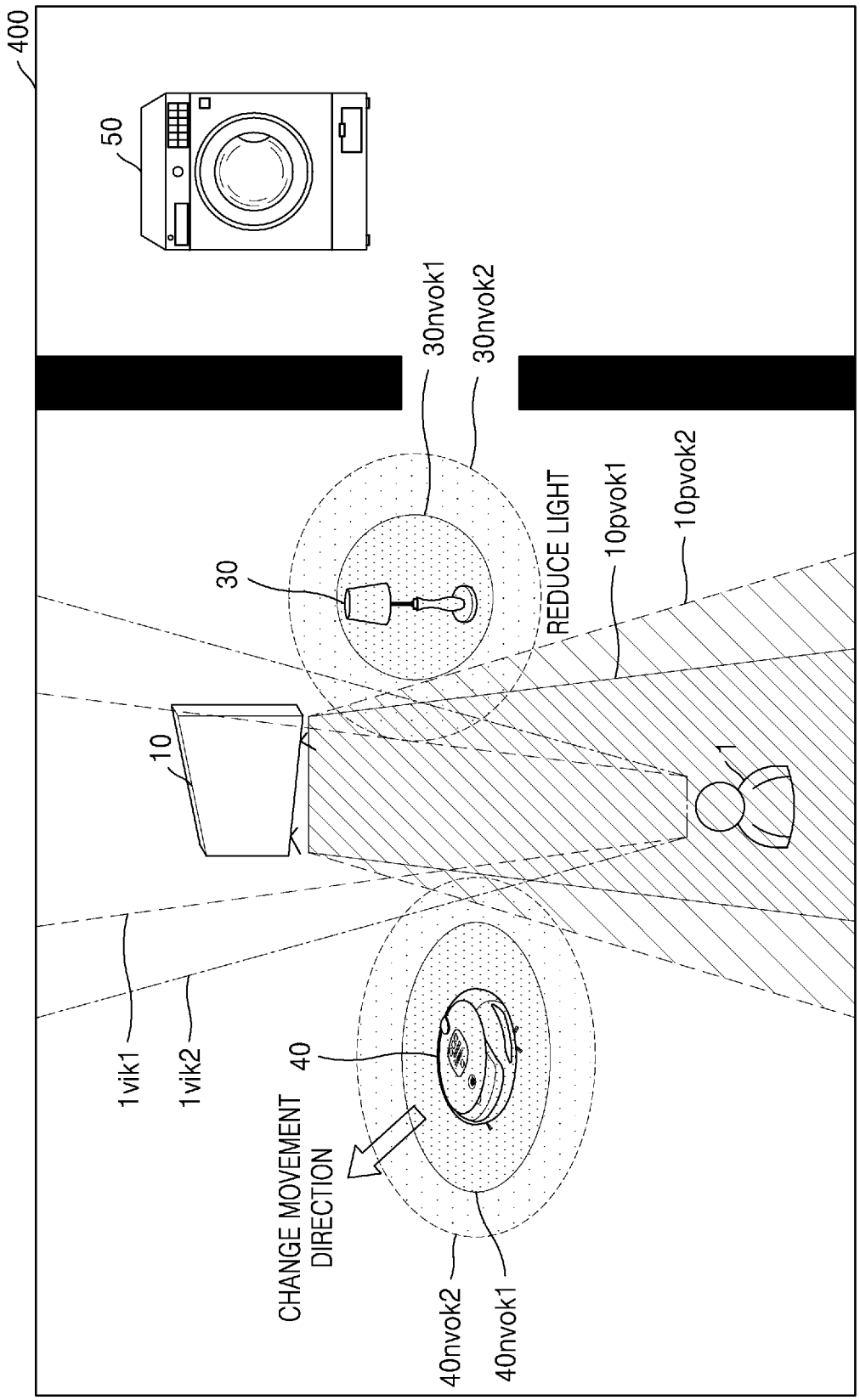

The server 100 may generate a score map for each selected modality. FIGS. 3 and 4 respectively show score maps 300 and 400 for visual modality, and FIGS. 5 and 6 respectively show score maps 500 and 600 for auditory modality.

Figure 5:
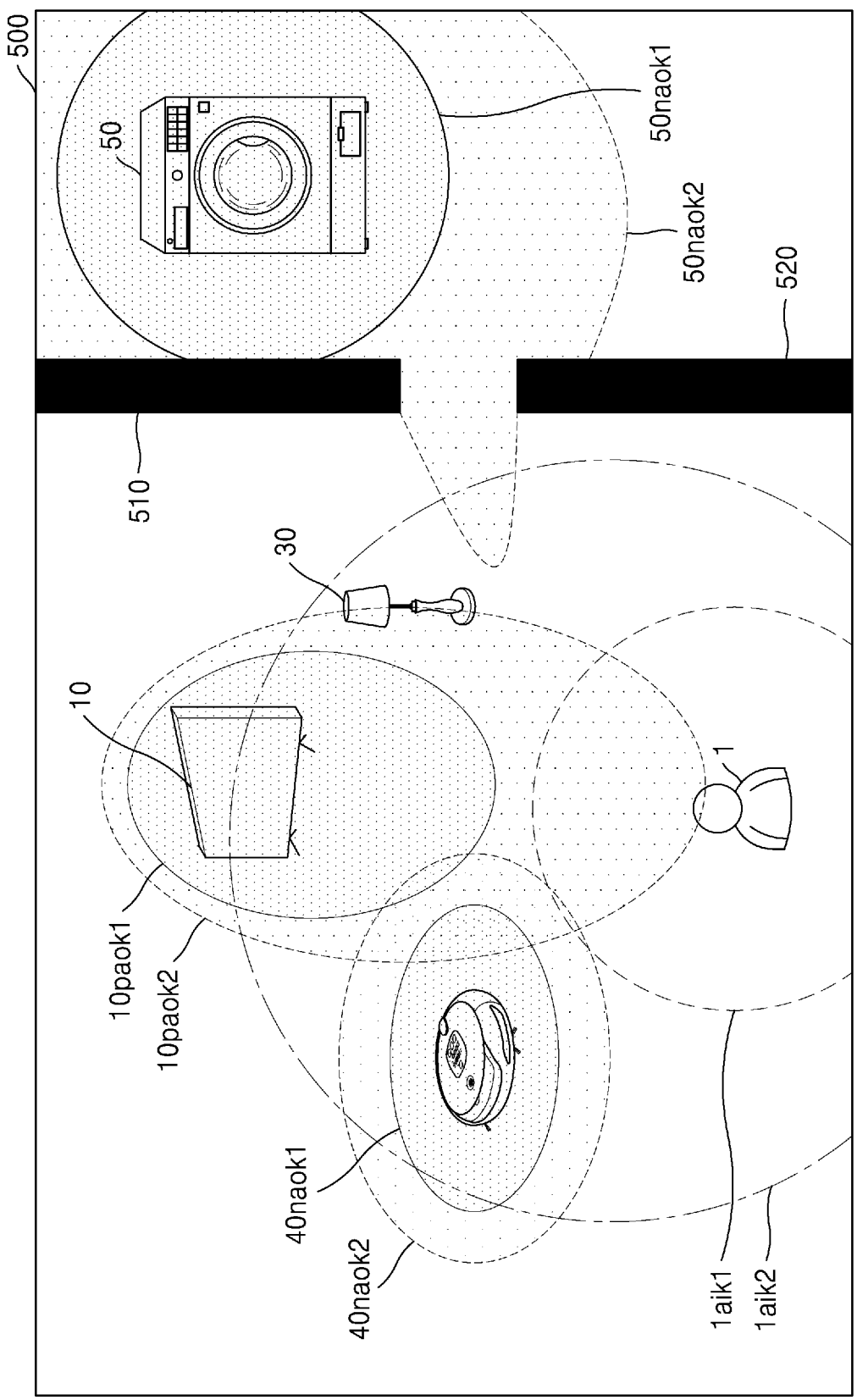
Figure 6:
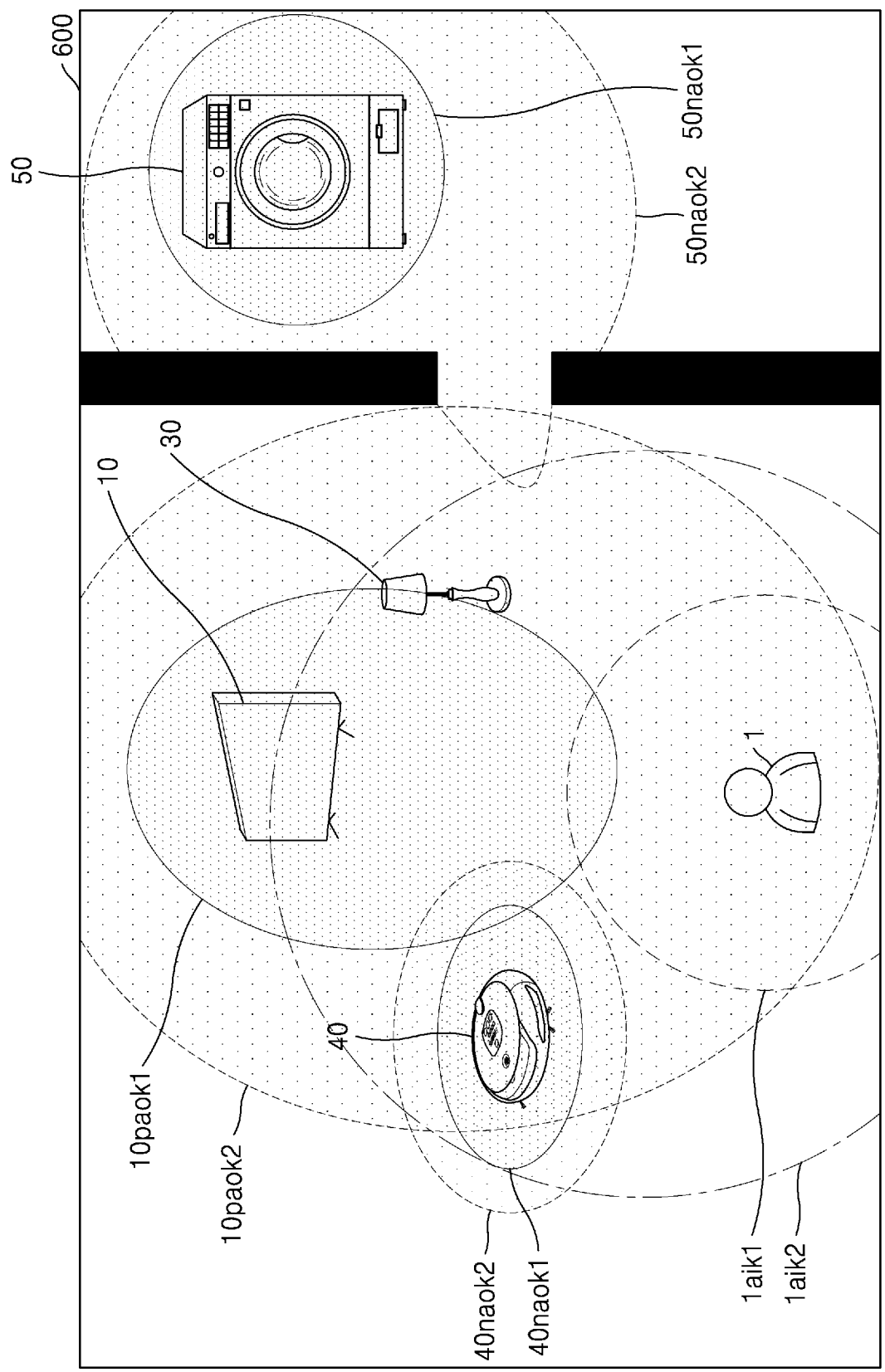

The score map 300 shown in FIG. 3 and the score map 500 shown in FIG. 5 are score maps for a situation before the server 100 controls the electronic devices 10, 30, 40, and 50, and the score map 400 shown in FIG. 4 and the score map 600 shown in FIG. 6 are score maps for a situation after the server 100 controls the electronic devices 10, 30, 40, and 50.

First, a method by which the server 100 generates the score map 300 for visual modality is described with reference to FIG. 3, and then, a method by which the server 100 generates the score map 300 for auditory modality is described with reference to FIG. 5.

The server 100 may display locations of the user 1 and the electronic devices 10, 30, 40, and 50 on the score map 300, and display an input/output kernel for visual modality. According to an embodiment of the disclosure, the server 100 may identify the locations of the user 1 and the electronic devices 10, 30, 40, and 50 from an image captured by the camera 300. In addition, according to an embodiment of the disclosure, the server 100 may identify the locations through location measurement using wireless communication between the electronic devices 10, 30, 40, and 50. In addition, according to an embodiment of the disclosure, information about a locations of electronic devices that do not move frequently, such as the TV 10 or a washing machine 50, may be pre-stored in the server 100.

In generating the score map 300 for visual modality, the score map 300 may display an output kernel for electronic devices that affect the visual field of the user 1 from among the electronic devices 10, 30, 40, and 50, and display an input kernel (a range of an area that the user may visually perceive) for the user 1.

A method by which the server 100 displays output kernels 10pvok1 and 10pvok2 for the TV 10 is described below.

Because an image output from the TV 10 is an output of interest of the user 1, an output kernel with positive characteristics may be set and displayed for the TV 10.

The output kernel of the TV 10 may be divided into a plurality of levels according to a degree to which the visual field of the user 1 is affected by the output kernel, and in embodiments of the disclosure, for convenience of description, it is assumed that all input/output kernels are divided into two levels. Referring to FIG. 3, the first output kernel 10pvok1 and the second output kernel 10pvok2 are displayed for the TV on the score map 300. The first output kernel 10pvok1 is an area that has more influence on the visual field of the user 1 than the second output kernel 10pvok2, and this difference may be reflected when calculating the score. (e.g., the higher the level of the output kernel, the greater the impact on the score) A specific method by which the level of the output kernel is reflected when calculating the score is described in the section describing the score calculation below.

As for reference numerals for the input/output kernels used in the disclosure, "positive visual output kernel (pvok)" is used for the output kernel with positive characteristics for visual modality, and "negative visual output kernel (nvok)" is used for the output kernels with negative characteristics for visual modality. In addition, "visual input kernel (vik)" is used for the input kernel with the input kernels for visual modality. Reference numerals are used in a similar manner for other types of input/output kernels. (cf. "positive auditory output kernel (paok)" is used for the output kernels with positive characteristics for auditory modality, "negative auditory output kernel (naok)" is used for the output kernels with negative characteristics for auditory modality, and "auditory input kernel (aik)" is used for the input kernels for auditory modality.)

The output kernels 10pvok1 and 10pvok2 of the TV 10 may vary in shape and size (e.g., left and right width, length, or the like), depending on the characteristics or operation status of the TV 10. For example, when a display panel mounted on the TV 10 has a wide viewing angle, the left and right widths of the output kernels 10pvok1 and 10pvok2 may increase, and as the brightness of the output image of the TV 10 increases, sizes of the output kernels 10pvok1 and 10pvok2 may increase.

The server 100 may set the output kernels 10pvok1 and 10pvok2 according to output characteristics set as default for the TV 10, and when necessary, use capability information provided by the manufacturer of the TV 10 or information about an operation status (e.g., a brightness of the image) received from the TV 10 to correct the output kernels 10pvok1 and 10pvok2. In addition, according to an embodiment of the disclosure, the server 100 may identify the operation status of the TV 10 by analyzing an image captured of the TV 10 by other electronic devices (e.g., a camera) within the space, and correct the output kernels 10pvok1 and 10pvok2.

A method by which the server 100 displays output kernels 30nvok1 and 30nvok2 for the light 30 is described below.

Light radiated from the light 30 may interfere with watching the TV 10, and therefore, an output kernel with negative characteristics may be set and displayed for the light 30. However, an output kernel of the light 30 may have positive characteristics, depending on the surrounding environment, such as the tendency of the user 1 or the location of the light 30, but it the present embodiment of the disclosure, it is assumed that the output kernel of the light 30 has negative characteristics.

The output kernel of the light 30 may be divided into a plurality of levels according to the degree to which the visual field of the user 1 is affected, and in the score map 300 in FIG. 3, the first output kernel 30nvok1 and the second output kernel 30nvok2 are displayed for the light 30. Because the brightness of the light 30 increases as a distance from the light 30 decreases, referring to FIG. 3, the first output kernel 30nvok1 is set up to a certain distance from the light 30, and the second output kernel 30nvok2 is set for a certain area thereafter.

The output kernels 30nvok1 and 30nvok2 of the light 30 may vary in shape and size depending on the characteristics or operation status of the light 30. For example, as the output of the light 30 becomes brighter, the sizes of the output kernels 30nvok1 and 30nvok2 may increase, and when the output of the light 30 has directionality, the shapes of the output kernels 30nvok1 and 30nvok2 may also be set to have directionality.

The server 100 may set the output kernels 30nvok1 and 30nvok2 according to output characteristics set as default for the light 30, and when necessary, use capability information provided by the manufacturer of the light 30 or information about an operation status received from the light 30 to correct the output kernels 30nvok1 and 30nvok2. In addition, the server 100 may analyze an image captured of the light 30 by other electronic devices (e.g., a camera) within the space to correct the output kernels 30nvok1 and 30nvok2.

A method by which the server 100 displays output kernels 40nvok1 and 40nvok2 for the robot cleaner 40 is described below.

Because the robot cleaner 40 performs cleaning while moving within the space, the robot cleaner 40 may interfere with the visual field of the user 1 while watching the TV 10. Accordingly, the server 100 may set and display an output kernel with negative characteristics for the surroundings of the robot cleaner 40.

The output kernel of the robot cleaner 40 may be divided into a plurality of levels according to the degree to which the visual field of the user 1 is affected, and in the score map 300 in FIG. 3, the first output kernel 40nvok1 and the second output kernel 40nvok2 are displayed for the robot cleaner 40.

The output kernels 40nvok1 and 40nvok2 of the robot cleaner 40 may vary in shape and size depending on the characteristics or operation status of the robot cleaner 40. For example, as the movement speed of the robot cleaner 40 increases, and the sizes of the output kernels 40nvok1 and 40nvok2 may increases, and the shapes of the output kernels may be determined according to the movement direction of the robot cleaner 40.

The server 100 may set the output kernels 40nvok1 and 40nvok2 according to output characteristics set as default for the robot cleaner 40, and when necessary, use capability information provided by the manufacturer of the robot cleaner 40 or information about an operation status (e.g., movement speed and movement direction) received from the robot cleaner 40 to correct the output kernels 40nvok1 and 40nvok2. In addition, the server 100 may analyze an image captured of the robot cleaner 40 by other electronic devices (e.g., a camera) within the space to correct the output kernels 40nvok1 and 40nvok2.

It may be identified that an output kernel is not set for the washing machine 50 from among the electronic devices 10, 30, 40, and 50 displayed on the score map 300 in FIG. 3. As described above, the score map 300 in FIG. 3 is a score map for visual modality, and because the washing machine 50 operates at a fixed location, the washing machine 50 does not have an output that affects the visual field of the user 1, and therefore, when generating the score map 300 for visual modality, an output kernel for the washing machine 50 may not be displayed. When generating a score map for visual modality, an output kernel may not be displayed for other electronic devices operating at fixed positions.

The server 100 may set and display input kernels 1vik1 and 1vik2 for a range of an area that may be visually recognized by the user 1. The input kernel of the user 1 may also be divided into a plurality of levels. In the score map 300 in FIG. 3, the first input kernel 1vik1 and the second input kernel 1vik2 are displayed for the user 1. Although not shown in FIG. 3, a higher level input kernel may be set in a preset appropriate recommended distance area.

2-2) (First Embodiment) Generate a Score Map for Auditory Modality (FIG. 5)

This time, a method by which the server 100 generates the score map 300 for auditory modality is described with reference to FIG. 5.

The server 100 may display locations of the user 1 and the electronic devices 10, 30, 40, and 50 on the score map 300, and display an input/output kernel for auditory modality. A method by which the server 100 identifies locations of the user 1 and the electronic devices 10, 30, 40, and 50 and displays the locations on the score map 500 is described above.

In generating the score map 500 for auditory modality, the score map 500 may display an output kernel for electronic devices that affect the hearing of the user 1 from among the electronic devices 10, 30, 40, and 50, and display an input kernel (a range of an area that the user may auditorily perceive) for the user 1.

A method by which the server 100 displays output kernels 10paok1 and 10paok2 for the TV 10 is described below.

Because a sound output from the TV 10 is an output of interest of the user 1, an output kernel with positive characteristics may be set and displayed for the TV 10.

Referring to FIG. 5, the first output kernel 10paok1 is displayed up to a certain distance from the TV 10, and the second output kernel 10paok2 is set for a certain area thereafter.

Shapes and sizes of the operation status of the TV 10 vary depending on the characteristics or operation status of the TV 10, and the server 100 may correct the operation status of the TV 10, as described above in the section on the server 100 for visual modality.

The server 100 may also display output kernels for the robot cleaner 40 and the washing machine 50, and operation noise occurring from the robot cleaner 40 and the washing machine 50 is a factor that interferes with watching the TV 10, and thus, the server 100 may display output kernels with negative characteristics for the robot cleaner 40 and the washing machine 50.

Shapes and sizes of output kernels 40naok1, 40naok2, 50naok1, and 50naok2 of the robot cleaner 40 and the washing machine 50 may vary depending on the characteristics or operation status of the robot cleaner 40 or washing machine 50, and the server 100 may correct the output kernels 40naok1, 40naok2, 50naok1, and 50naok2 of the robot cleaner 40 and the washing machine 50, as described above in the section on the server 100 for visual modality.

According to an embodiment of the disclosure, the server 100 may set an input/output kernel by reflecting a structure of a space in which the electronic devices 10, 30, 40, and 50 are located. As shown in the score map 500 in FIG. 5, the space in which a space where the washing machine 50 is located and a space where the remaining electronic devices 10, 30, and 40 are located are separated by walls 510 and 520. Because the walls 510 and 520 may block noise to some extent, and the second output kernel 50naok2 of the washing machine 50 may set to extend through a space between the walls 510 and 520.

It may be identified that an output kernel is not set for the light 30 from among the electronic devices 10, 30, 40, and 50 displayed on the score map 500 in FIG. 5. The score map 500 in FIG. 5 is a score map for auditory modality, and because the light 30 does not output sound and does not cause operating noise, when generating the score map 500 for auditory modality, an output kernel for the light 30 may not be displayed.

The server 100 may set and display input kernels 1aik1 and 1aik2 for a range of an area that may be auditorily recognized by the user 1. The input kernel for the user 1 may also be divided into a plurality of levels, and the first input kernel 1aik1 and the second input kernel 1aik2 are displayed for the user 1 on the score map 500 in FIG. 5.

3) (First Embodiment) Calculate a Score for Each Modality Based on the Score Map The server 100 may calculate a score for visual modality based on an area of an input/output kernel displayed on the score map 300 in FIG. 3. A method of calculating a score by using the score map 300 in FIG. 3 is described. The score calculated by using the score map 300 may increase as an area of a region in which an output kernel and an input kernel with positive characteristics included in the score map 300 overlap each other increases, and conversely, may decrease as an area of a region in which an output kernel and an input kernel with negative characteristics overlap each other increases.

As described above, the higher the level of the input/output kernel, the greater the impact on the score. In embodiments of the disclosure, it is assumed that the score is calculated according to the rules described below. The rules apply equally to embodiments described below. However, a weight applied according to the level of the input/output kernel in the example below is only an example and may be differently set in various ways.

It is assumed that, among the two-stage input (output) kernels, the higher level one is a first input (output) kernel, and the lower level one is a second input (output) kernel.

An area of a region in which the first input kernel and the first output kernel overlap each other is multiplied by a.

An area of a region in which the first input kernel and the second output kernel overlap each other is multiplied by b.

An area of a region in which the second input kernel and the first output kernel overlap each other is multiplied by b.

An area of a region in which the first input kernel and the first output kernel overlap each other is multiplied by c.

a>b>c

Add a value obtained by multiplying a weight by the area of the region in which the output kernel and the input kernel with positive characteristics overlap each other, and subtract a value obtained by multiplying a weight by the area of the region in which the output kernel and the input kernel with negative characteristics overlap each other.

A process of calculating a score for the score map 300 according to the rules described above is described below.

① A value obtained by multiplying an area of a region in which the first input kernel 1vik1 of the user 1 and the first output kernel 10pvok1 of the TV 10 overlap each other by a is referred to as P1.

② A value obtained by multiplying an area of a region in which the first input kernel 1vik1 of the user 1 and the second output kernel 10pvok2 of the TV 10 overlap each other by b is referred to as P2.

③ A value obtained by multiplying an area of a region in which the second input kernel 1vik2 of the user 1 and the first output kernel 10pvok1 of the TV 10 overlap each other by b is referred to as P3.

④ A value obtained by multiplying an area of a region in which the second input kernel 1 vik2 of the user 1 and the second output kernel 10pvok2 of the TV 10 overlap each other by c is referred to as P4.

⑤ A value obtained by multiplying an area of a region in which the first input kernel 1vik1 of the user 1 and the first output kernel 30nvok1 of the light 30 overlap each other by a is referred to as N1.

⑥ A value obtained by multiplying an area of a region in which the first input kernel 1vik1 of the user 1 and the second output kernel 30nvok2 of the light 30 overlap each other by b is referred to as N2.

⑦ A value obtained by multiplying an area of a region in which the second input kernel 1vik2 of the user 1 and the first output kernel 30nvok1 of the light 30 overlap each other by b is referred to as N3.

⑧ A value obtained by multiplying an area of a region in which the second input kernel 1vik2 of the user 1 and the second output kernel 30nvok2 of the light 30 overlap each other by c is referred to as N4.

⑨ A value obtained by multiplying an area of a region in which the first input kernel 1vik1 of the user 1 and the first output kernel 40nvok1 of the robot cleaner 40 overlap each other by a is referred to as N5.

⑩ A value obtained by multiplying an area of a region in which the first input kernel 1vik1 of the user 1 and the second output kernel 40nvok2 of the robot cleaner 40 overlap each other by b is referred to as N6.

⑪ A value obtained by multiplying an area of a region in which the second input kernel 1 vik2 of the user 1 and the first output kernel 40nvok1 of the robot cleaner 40 overlap each other by b is referred to as N7.

⑫ A value obtained by multiplying an area of a region in which the second input kernel 1vik2 of the user 1 and the second input kernel 1vik2 of the robot cleaner 40 overlap each other by c is referred to as N8.

In the case described above, a score calculated through the score map 300, that is, a score for visual modality, is (P1+P2+P3+P4−N1−N2−N3−N4−N5−N6−N7−N8).

This score calculation method is only an example, and the score may be calculated in various ways as long as the rules described below are maintained.

(Rule) The larger the area of the region in which the output kernel and the input kernel with positive characteristics overlap each other, the higher the score. Conversely, the larger the area of the region in which the output kernel and the input kernel with negative characteristics overlap each other, the lower the score.

In addition, according to an embodiment of the disclosure, as described above, the server 100 may calculate a score by performing a convolution operation on the input kernel and the output kernel included in the score map 300. The detailed method is described below.

The first input kernel 1vik1 and the second input kernel 1vik2 of the user 1 may be expressed as $I_u(i, j)$. Although not shown in FIG. 3, a higher level input kernel may be set in a preset appropriate recommended distance area.

The first output kernel 10pvok1 and the second output kernel 10pvok2 of the TV 10 may expressed as $O_t(i, j, a_t)$, and a kernel value may change depending on the action $a_t$ (e.g., a brightness of an image, a type of content being reproduced, or the like) of the TV 10.

The first output kernel 30nvok1 and the second output kernel 30nvok2 of the light 30 may be expressed as $O_l(i, j, a_l)$, and at least one of locations at which the output kernels 30nvok1 and 30nvok2 are displayed or a kernel value may change depending on an action $a_l$ (e.g., illuminance, color, or the like) of the light 30.

The first output kernel 40nvok1 and the second output kernel 40nvok2 of the robot cleaner 40 may be expressed as $O_r(i, j, a_r)$, and at least one of locations at which the output kernels 40nvok1 and 40nvok2 are displayed or a kernel value may change depending on an action $a_r$ (e.g., movement direction and movement speed, low noise mode/turbo mode, or the like) of the robot cleaner 40.

The server 100 may calculate a score $S_v$ for visual modality according to Equation 3 below.

$$S_v = \sum_{k,j \in I_u} \sum_{d \in \{t,r,l\}} I_u(i, j) * O_d(i, j, a_d) \qquad \text{Equation 3}$$

The server 100 may calculate a score for auditory modality by using the score map 500 in FIG. 5, through the method described above with reference to FIG. 3.

(3) (First Embodiment) Control the Operation of the Electronic Devices Based on the Calculated Score When the score for visual modality is calculated from the score map 300 in FIG. 3 and the score for auditory modality is calculated from the score map 500 in FIG. 5, the score map 300 may control operations of the electronic devices 10, 30, 40, and 50 based on the scores.

According to an embodiment of the disclosure, the server 100 may control the electronic devices 10, 30, 40, and 50 in a way to increase the score for visual modality calculated from the score map 300 in FIG. 3. For example, the server 100 may reduce the brightness of the light 30 to reduce the area of the output kernels 30nvok1 and 30nvok2 of the light 30 overlapping the input kernels 1vik1 and 1vik2 of the user 1. Due to the above, the interference caused by the light of the light 30 is reduced, and the user 1 may view the image of the TV 10 more clearly.

According to an embodiment of the disclosure, the server 100 may predict a score after a certain time from a situation shown in the score map 300 in FIG. 3, and control the electronic devices 10, 30, 40, and 50 in a way to increase the expected score. For example, in the score map 300 in FIG. 3, the robot cleaner 40 is moving in the viewing direction of the user 1, and after a certain period of time, an area of a region in which the input kernels 1vik1 and 1vik2 of the user 1 and the output kernels 40nvok1 and 40nvok2 of the robot cleaner 40 overlap each other further increases, and accordingly, the score (expected score after the certain period of time) may decrease. Accordingly, the server 100 may change the movement direction of the robot cleaner 40 away from the visual field of the user 1 to increase the expected score after the certain period of time.

According to an embodiment of the disclosure, the server 100 may control the operations of the electronic devices 10, 30, 40, and 50 through a cost function, as described above. When the score $S_v$ for visual modality is calculated through Equation 3 above, the server 100 may determine actions of the electronic devices 10, 30, 40, and 50 within a target time range T through Equation 4 below.

$$\operatorname{argmax} \sum\nolimits_{t=O \sim T} S_v(a_r(t),\ a_t(t),\ a_l(t)) \quad \text{Equation 4}$$

FIG. 4 shows the score map 400 for a situation after the server 100 controls the electronic devices 10, 30, 40, and 50 in the situation of the score map 300 in FIG. 3. Compared to the score map 300 in FIG. 3, in the score map 400, it may be identified that the sizes of the output kernels 30nvok1 and 30nvok2 have become smaller. In addition, the movement direction of the robot cleaner 40 is changed to a direction away from the input kernels 1vik1 and 1 vik2 of the user 1. Due to this control, the score for visual modality increases, and the user 1 is less disturbed by the view due to the light of the light 30 or the movement of the robot cleaner 40, and thus, the experience of the user 1 may be optimized in the context of "watching TV".

According to an embodiment of the disclosure, the server 100 may control the electronic devices 10, 30, 40, and 50 in a way to increase the score for auditory modality calculated from the score map 500 in FIG. 5. For example, the server 100 may increase the volume of the TV 10 to increase the area of the output kernels 10paok1 and 10paok2 of the TV 10 overlapping the input kernels 1aik1 and 1aik2 of the user 1. Due to the above, the user 1 may hear the sound output from the TV 10 more clearly. In addition, for example, the server 100 may reduce operating noise from the robot cleaner 40 and the washing machine 50 (switches to a low-noise mode or pauses) to reduce areas of the output kernels 40naok1, 40naok2, 50naok1, and 50naok2 of the two electronic devices 40 and 50 overlapping the input kernels 1aik1 and 1aik2 of the user 1. Due to the above, the user 1 is less disturbed by noise from the electronic devices 40 and 50 and may focus more on the sound of the TV 10.

According to an embodiment of the disclosure, the server 100 may calculate the score $S_v$ for visual modality, calculate the score $S_v$ for auditory modality in the same manner as scheduling the actions of the electronic devices 10, 30, 40, and 50 through a cost function, and control the operations of the electronic devices 10, 30, 40, and 50 based on the scores.

FIG. 6 shows the score map 600 for a situation after the server 100 controls the electronic devices 10, 30, 40, and 50 in the situation of the score map 500 in FIG. 5. Compared to the score map 500 in FIG. 5, in the score map 600 in FIG. 6, it may be identified that the sizes of the output kernels 10paok1 and 10paok2 of the TV, which are output kernels with positive characteristics, have increased. On the other hand, it may be identified that the sizes of the output kernels 40naok1 and 40naok2 of the robot cleaner 40 and the output kernels 50naok1 and 50naok2 of the washing machine 50, which are output kernels with negative characteristics, have decreased. Due to this control, the score for auditory modality increases, and the user 1 is less disturbed by the operating noise of the robot cleaner 40 or washing machine 50, and thus, the experience of the user 1 may be optimized in the context of "watching TV".

3. Description of the Second Embodiment (when the Context is "Communicating with AI Speaker)")

(1) (Second Embodiment) Determine the Context of the User

First, the server 100 may determine the context of the user 1. The server 100 may determine the context of the user 1 according to various methods, and FIG. 7 shows one embodiment thereof.

Figure 7:
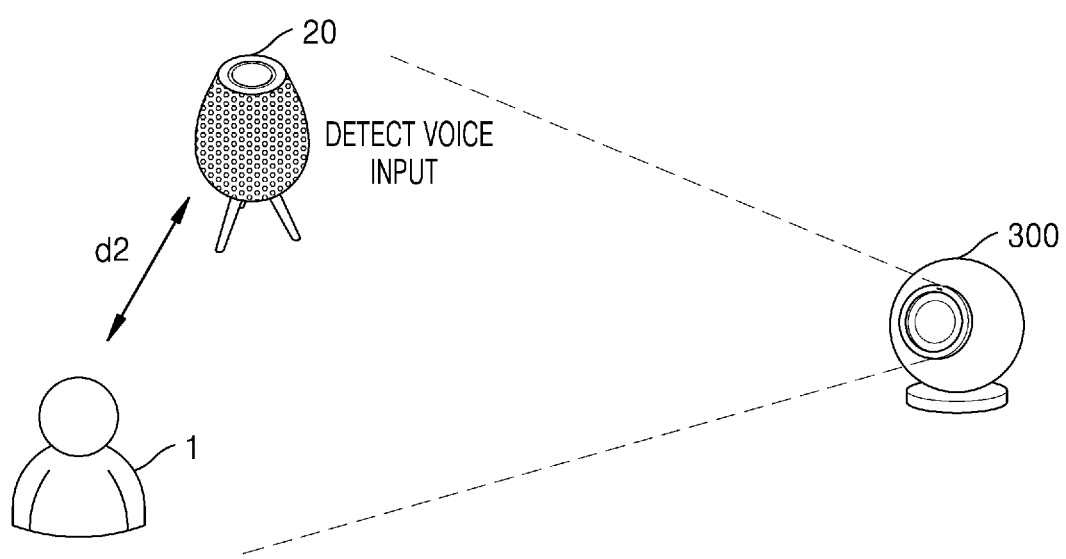
FIGS. 7, 8, 9, 10, and 11 are diagrams illustrating a second embodiment (a case where context is "communication with artificial intelligence (AI) speaker") according to various embodiments of the disclosure.

Referring to FIG. 7, the camera 300 may photograph the user 1 and the AI speaker 20, and transmit the captured image to the server 100. The server 100 may analyze the received captured image to identify locations of the user 1 and the AI speaker 20 and a motion of the user 1.

In the embodiment shown in FIG. 7, when a distance d2 between the user 1 and the AI speaker 20 is a preset reference value (e.g., 1 meter) or less and a facing direction of the user 1 faces the AI speaker 20 (e.g., when an angle formed by the facing direction of the user 1 and the straight line connecting the user 1 with the AI speaker 20 is the preset reference value or less), the server 100 may determine that the context of the user 1 is "communicating with AI speaker".

According to an embodiment of the disclosure, the server 100 may receive information about an operation status (e.g., a voice input received) from the AI speaker 20, and determine the context of the user 1 by considering the information together with the captured image received from the camera 300.

According to an embodiment of the disclosure, the server 100 may apply the captured image received from the camera 300 to a pre-trained neural network as an input, and determine the inference result of the neural network as the context of the user 1.

(2) (Second Embodiment) Calculate a Score According to the Context

The server 100 may generate a score map according to the determined context (communicating with AI speaker), and calculate a score by using the score map.

1) (Second Embodiment) Select at Least One Modality According to the Context

Because the determined context is "communicating with AI speaker", the server 100 may select auditory modality. Information indicating that the modality corresponding to "communicating with AI speaker" is auditory modality may be pre-stored in the server 100. The server 100 may calculate a score for the selected modality.

2) (Second Embodiment) Generate a Score Map for Each Selected Modality

The server 100 may generate a score map for the selected auditory modality. In the case where the context is "communicating with AI speaker", when the user 1 outputs a voice, the AI speaker 20 receives the output sound, and conversely, when the AI speaker 20 outputs a voice, the user 1 hears the output sound. Accordingly, input kernels respectively corresponding to the user 1 and the AI speaker 20 may be present. For convenience of description, a score map indicating the input kernel of the user 1 and a score map indicating the input kernel of the AI speaker 20 are shown separately. In a score map 800 in FIG. 8 and a score map 900 in FIG. 9, the input kernels 1aik1 and 1aik2 of the user 1 are shown, and in a score map 1000 in FIG. 1 and a score map 1100 in FIG. 11, input kernels 20aik1 and 20aik2 are shown.

Figure 8:
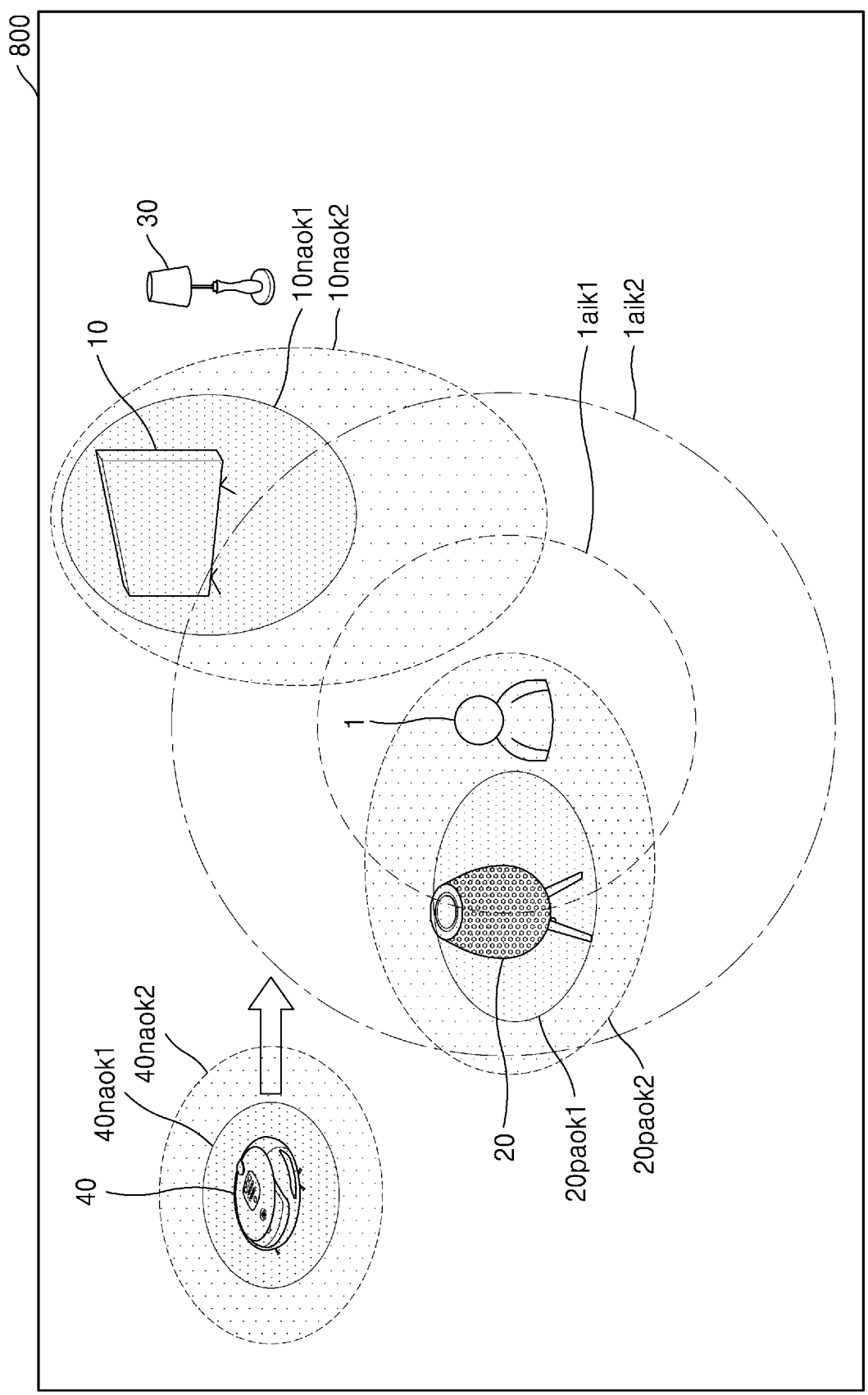
Figure 9:
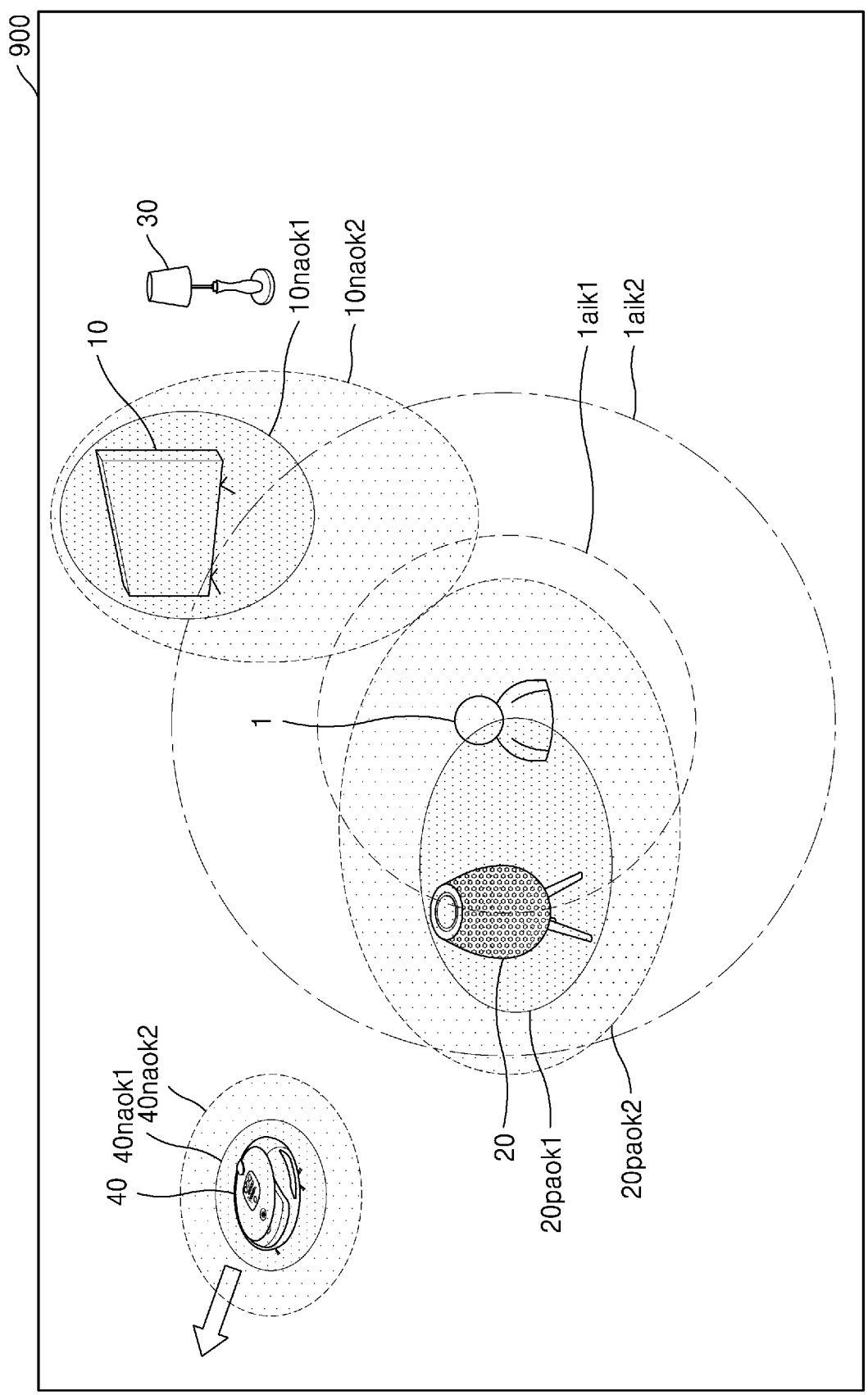
Figure 10:
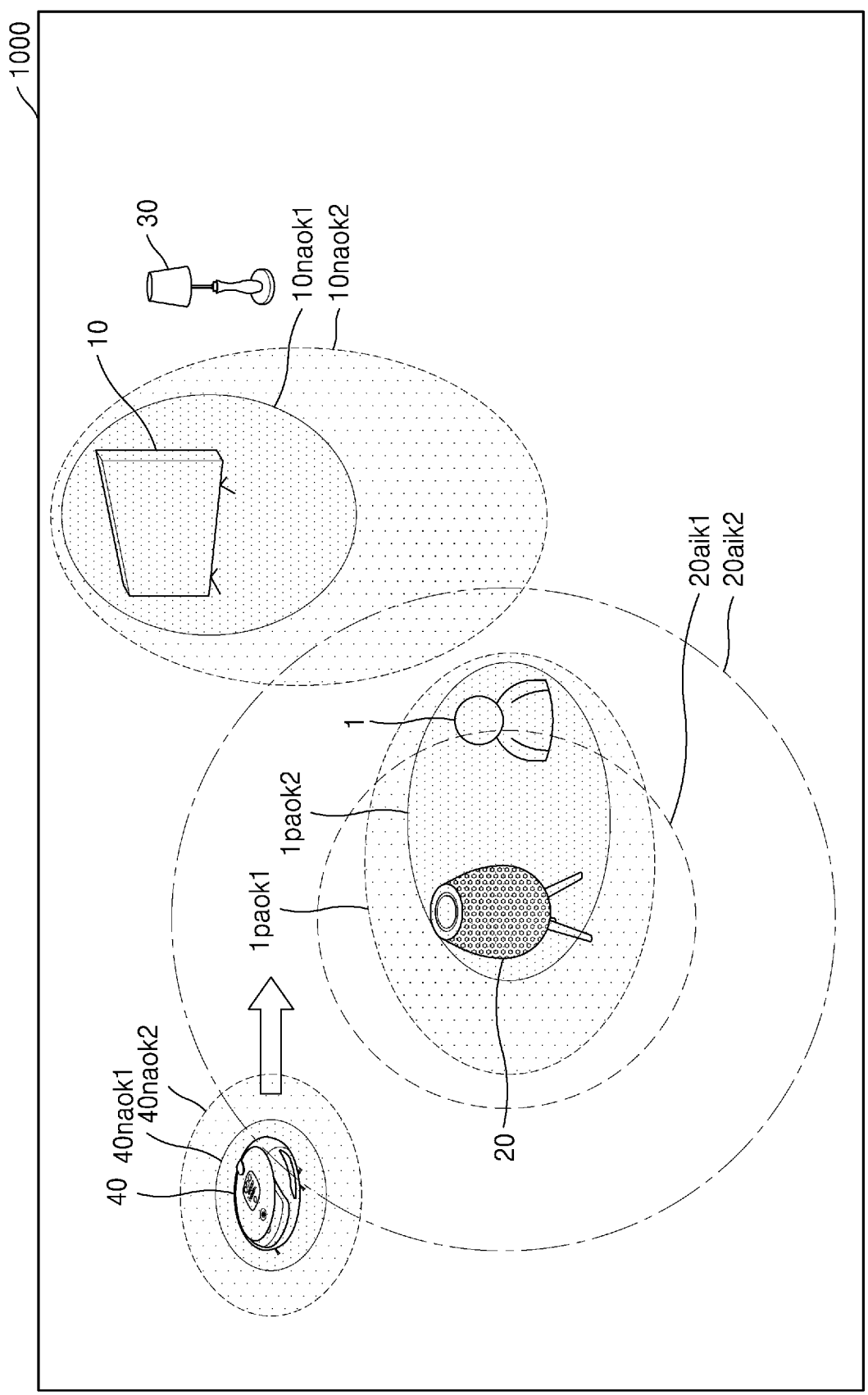
Figure 11:
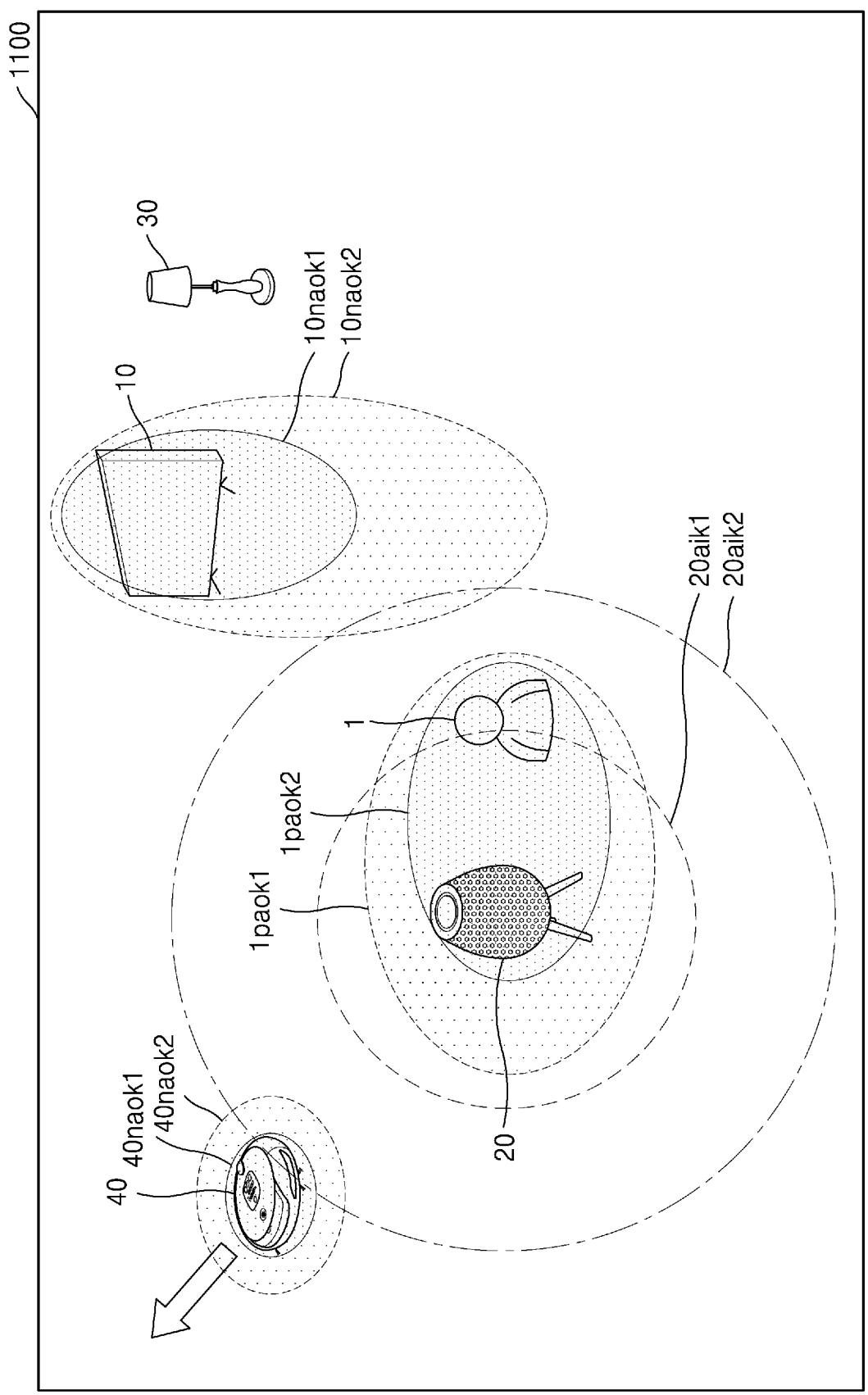

The score map 800 shown in FIG. 8 and the score map 1000 shown in FIG. 10 are score maps for a situation before the server 100 controls the electronic devices 10, 20, 30, and 40, and the score map 900 shown in FIG. 9 and the score map 1100 shown in FIG. 11 are score maps for a situation after the server 100 controls the electronic devices 10, 20, 30, and 40.

A method by which the server 100 generates the score maps 800 and 1000 for auditory modality is described with reference to FIGS. 8 and 10.

The server 100 may display locations of the user 1 and the electronic devices 10, 20, 30, and 40 on the score maps 800 and 1000, and display an input/output kernel for auditory modality. A method by which the server 100 identifies locations of the electronic devices 10, 20, 30, and 40 is as described above. (cf. location measurement through analysis of captured images or wireless communication between electronic devices)

Referring to FIG. 8, the server 100 may display an output kernel for an electronic device that affects the hearing of the user 1 from among the electronic devices 10, 20, 30, and 40, and display an input kernel (range of an area that may be auditorily perceived by the user) for the user 1 on the score map 800.

Because a voice output from the AI speaker 20 is an output of interest of the user 1, output kernels 20paok1 and 20paok2 with positive characteristics are displayed for the AI speaker 20. The output kernels 20paok1 and 20paok2 of the AI speaker 20 are divided into two levels, and the first output kernel 20paok1 is an area that has more influence on the hearing of the user 1 than the second output kernel 20paok2, and this difference may be reflected when calculating a score.

The output kernels 20paok1 and 20paok2 of the AI speaker 20 may increase in size as the volume increases and extend longer in a direction in which the voice is output. The server 100 may set the output kernels 20paok1 and 20paok2 according to output characteristics set as default for the AI speaker 20, and when necessary, use capability information provided by the manufacturer of the AI speaker 20 or information about an operation status (e.g., a volume) received from the AI speaker 20 to correct the output kernels 20paok1 and 20paok2. In addition, the server 100 may correct the output kernels 20paok1 and 20paok2 based on information measured by other electronic devices (e.g., a smartphone) in the space about the volume and voice output direction of the AI speaker 20.

In a situation where the user 1 communicates with the AI speaker 20, the voice output from the TV 10 may be disruptive. Accordingly, an output kernel with negative characteristics may be set and displayed for the TV 10. Shapes and sizes of output kernels 10naok 1 and 10naok2 of the TV 10 may also be determined according to output characteristics of the TV 10.

Because the operating noise of the robot cleaner 40 may also be disruptive, output kernels 40naok1 and 40naok2 with negative characteristics may be displayed for the robot cleaner 40.

The score map 800 in FIG. 8 is a score map for auditory modality, and because the light 30 does not output sound and does not cause operating noise, an output kernel for the light 30 may not be displayed on the score map 800.

The server 100 may display input kernels 1aik1 and 1aik2 for a range of an area that may be auditorily recognized by the user 1.

Referring to FIG. 10, the server 100 may display an output kernel for electronic devices that affect a voice input of the AI speaker 20, and may also display an output kernel for the user 1.

Because a voice command of the user 1 is an output of interest of the AI speaker 20, output kernels 1paok1 and 1paok2 with positive characteristics may be displayed for the user 1.

However, because the sound of the TV 10 or the operating noise of the robot cleaner 40 interferes with the AI speaker 20 recognizing voice commands, output kernels 10naok1, 10naok2, 40naok1, and 40naok2 with negative characteristics are displayed for the TV 10 and the robot cleaner 40.

Sizes of the output kernels 1paok1 and 1paok2 of the user 1 may be determined according to a size of the voice of the user 1 recognized by the AI speaker 20 or other nearby electronic devices.

As in the score map 800 in FIG. 8, shapes and sizes of the output kernels 10naok 1 and 10naok2 of the TV 10 and the output kernels 40naok1 and 40naok2 of the robot cleaner 40 may be determined according to output characteristics of the TV 10 and the robot cleaner 40, and may be corrected by the score map 800 when necessary.

The score map 1000 in FIG. 10 is a score map for auditory modality, and because the light 30 does not output sound and does not cause operating noise, an output kernel for the light 30 may not be displayed on the score map 1000.

3) (Second Embodiment) Calculate a Score for Each Modality Based on the Score Map The server 100 may calculate a score for auditory modality based on an area of input/output kernels displayed on the score map 800 in FIG. 8 and the score map 1000 in FIG. 10. Because a specific method of calculating a score by using a score map is described above with reference to FIG. 3, detailed descriptions thereof are omitted below.

According to an embodiment of the disclosure, in the score map 800 in FIG. 8, the score is a result of adding a certain weight to an area of a region in which the output kernels 20paok1 and 20paok2 of the AI speaker 20 and the input kernels 1aik1 and 1aik2 of the user 1 respectively overlap each other, conversely, subtracting a value obtained by multiplying an area of a region in which the output kernels 10naok 1 and 10naok2 of the TV 10 and the input kernels 1aik1 and 1aik2 of the user 1 respectively overlap each other by a certain weight, and subtracting a value obtained by multiplying an area of a region in which the output kernels 40naok1 and 40naok2 of the robot cleaner 40 and the input kernels 1aik1 and 1aik2 of the user 1 respectively overlap each other by a certain weight.

Similarly, in the score map 1000 in FIG. 10, the score is a result of adding a value obtained by multiplying a certain weight by an area of a region in which the output kernels 1paok1 and 1paok2 of the user 1 and the input kernels 20aik1 and 20aik2 of the AI speaker 20 respectively overlap each other, conversely, subtracting a value obtained by multiplying a certain weight by an area of a region in which the output kernels 10naok1 and 10naok2 of the TV 10 and the input kernels 20aik1 and 20aik2 of the AI speaker 20 respectively overlap each other, and subtracting a value obtained by multiplying a certain weight by an area of a region in which the output kernels 40naok1 and 40naok2 of the robot cleaner 40 and the input kernels 20aik1 and 20aik2 of the AI speaker 20 respectively overlap each other.

The server 100 may obtain a score for auditory modality by adding the score calculated by using the score map 800 in FIG. 8 and the score calculated by using the score map 1000 in FIG. 10.

(3) (Second Embodiment) Control the Operation of the Electronic Devices Based on the Calculated Score The server 100 may control the electronic devices 10, 20, 30, and 40 in a way to increase the score for auditory modality.

According to an embodiment of the disclosure, the server 100 may control the electronic devices such that the volume of the AI speaker 20 increases, and the voice or operating noise output from the robot cleaner 40 is reduced. In addition, when the robot cleaner 40 is moving toward the user 1 or AI speaker 20, the server 100 may control the robot cleaner 40 to move in a direction away from the user 1 or AI speaker 20. Because the light 30 does not affect auditory modality, the server 100 may not control an operation of the light 30.

An effect of the above control of the server 100 on the score is described below.

Compared to FIG. 8, in FIG. 9, it may be understood that the sizes of the output kernels 20paok1 and 20paok2 of the AI speaker 20 have increased, and sizes of the output kernels 10naok1 and 10naok2 of the TV 10 and the output kernels 40naok1 and 40naok2 of the robot cleaner 40 have all decreased. In addition, due to a change in the movement direction of the robot cleaner 40, an area of the region in which the output kernels 40naok1 and 40naok2 of the robot cleaner 40 and the input kernels 1aik1 and 1aik2 of the user 1 may be reduced. Accordingly, the score calculated from the score map 900 in FIG. 9 may be higher than the score calculated from the score map 800 in FIG. 8.

Referring to FIGS. 10 and 11, it may be understood that the sizes of the output kernels 10naok1 and 10naok2 of the TV 10 and the output kernels 40naok1 and 40naok2 of the robot cleaner 40 have decreased due to the control of the server 100. In addition, due to a change in the movement direction of the robot cleaner 40, an area of the region in which the output kernels 40naok1 and 40naok2 of the robot cleaner 40 and the input kernels 20aik1 and 20aik2 of the AI speaker 20 may be reduced. Accordingly, the score calculated from the score map 1100 in FIG. 11 may be higher than the score calculated from the score map 1000 in FIG. 10.

Due to this control, the score for auditory modality increases, and the user 1 is less disturbed by the noise due to the TV 10 or robot cleaner 40, and thus, the experience of the user 1 may be optimized in the context of "communicating with AI speaker".

Hereinafter, a configuration of a computing device (server 100) for performing embodiments of the disclosure is described with reference to the drawings, and then, a method of controlling a plurality of electronic devices according to the context of the user, according to embodiments of the disclosure, is described. The server 100 shown in FIG. 12 corresponds to a computing device for performing the embodiments described above, and FIGS. 13 to 16 show flowcharts summarizing the above-described embodiments in time series. Accordingly, even when omitted below, the features described above may be equally applied to embodiments described below.

Figure 12:
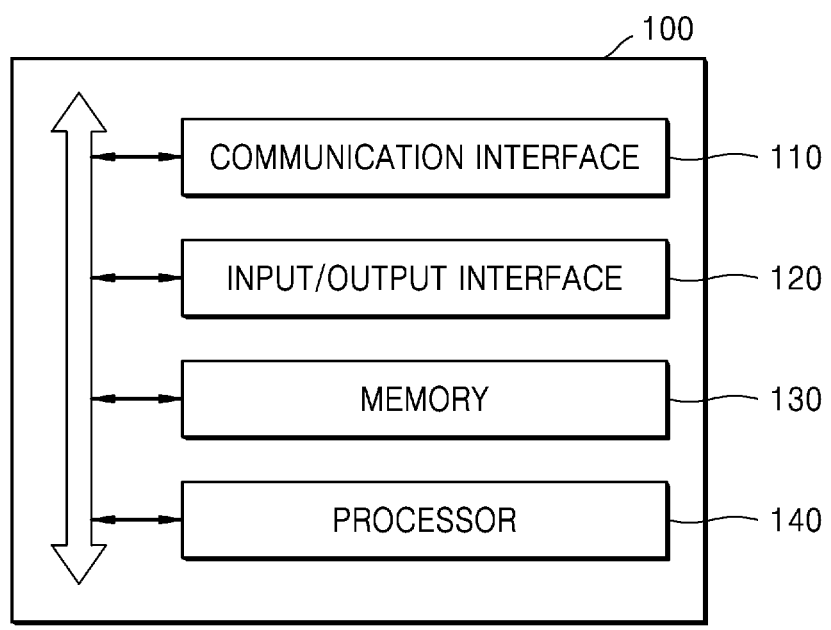
FIG. 12 is a diagram illustrating a detailed configuration of a computing device (server) for performing a method of controlling a plurality of electronic devices according to context of a user, according to an embodiment of the disclosure.

FIG. 12 is a diagram illustrating a detailed configuration of a server according to an embodiment of the disclosure.

Referring to FIG. 12, the server 100 according to an embodiment of the disclosure may include a communication interface 110, an input/output interface 120, memory 130, and a processor 140. However, elements of the server 100 are not limited to the examples described above, and the server 100 may include more elements or fewer components than the elements described above. In an embodiment of the disclosure, some or all of the communication interface 110, the input/output interface 120, the memory 130, and the processor 140 may be implemented in the form of one chip, and the processor 140 may include one or more processors.

The communication interface 110 is a configuration for transmitting and receiving signals (control commands, data, or the like) to and from external devices via a cable or wirelessly and may be configured to include a communication chipset that supports various communication protocols. The communication interface 110 may receive signals from the outside and output the signals to the processor 140, or may transmit a signal output from the processor 140 to the outside.

The input/output interface 120 may include an input interface (e.g., a touch screen, hard button, microphone, or the like) for receiving control commands or information from the user, and an output interface (e.g., a display panel, speaker, or the like) for displaying an execution result of an operation under the control of the user or a status of the server 100.

The memory 130 is a configuration for storing various programs or data and may include a storage medium, such as read-only memory (rom), random access memory (RAM), hard disk, compact disc-ROM (CD-ROM), or a digital versatile disc (DVD), or a combination thereof. The memory 130 may not be separately present and may be included in the processor 140. The memory 130 may include volatile memory, non-volatile memory, or a combination of volatile memory and non-volatile memory. Programs for performing operations according to embodiments of the disclosure may be stored in the memory 130. The memory 130 may provide stored data to the processor 140 according to a request from the processor 140.

The processor 140 is a configuration for controlling a series of processes for the server 100 to operate according to embodiments of the disclosure, and may include one or more processors. The one or more processors may include a general-purpose processor, such as a central processing unit (CPU), an application processor (AP), a digital signal processor (DSP), or the like, a dedicated graphic processor, such as a graphics processing unit (GP), a vision processing unit (VPU), or the like, or a dedicated AI processor, such as a neural processing unit (NPU). For example, the one or more processors are dedicated AI processors, they may be designed in a hardware structure that is specific to dealing with a particular AI model. The processor 140 may be communicatively coupled to the communication interface 110 and the memory 130.

The processor 140 may record data to the memory 130 or read data stored in the memory 130, and in particular, execute a program stored in the memory 130 to process data according to predefined operation rules or an AI model. Accordingly, the processor 140 may perform operations described in embodiments of the disclosure, and it may be seen that the operations described to be performed by the server 100 in the embodiments of the disclosure are performed by the processor 140, unless otherwise specified.

FIGS. 13, 14, 15, and 16 are flowcharts illustrating a method of controlling a plurality of electronic devices according to context of a user, according to various embodiments of the disclosure. Hereinafter, a method of controlling a plurality of electronic devices according to the context of the user, according to embodiments of the disclosure, is described with reference to FIGS. 13 to 16. Because operations described below are performed by the server 100 described so far, contents included in the embodiments described above may be equally applied even when omitted below.

Figure 13:
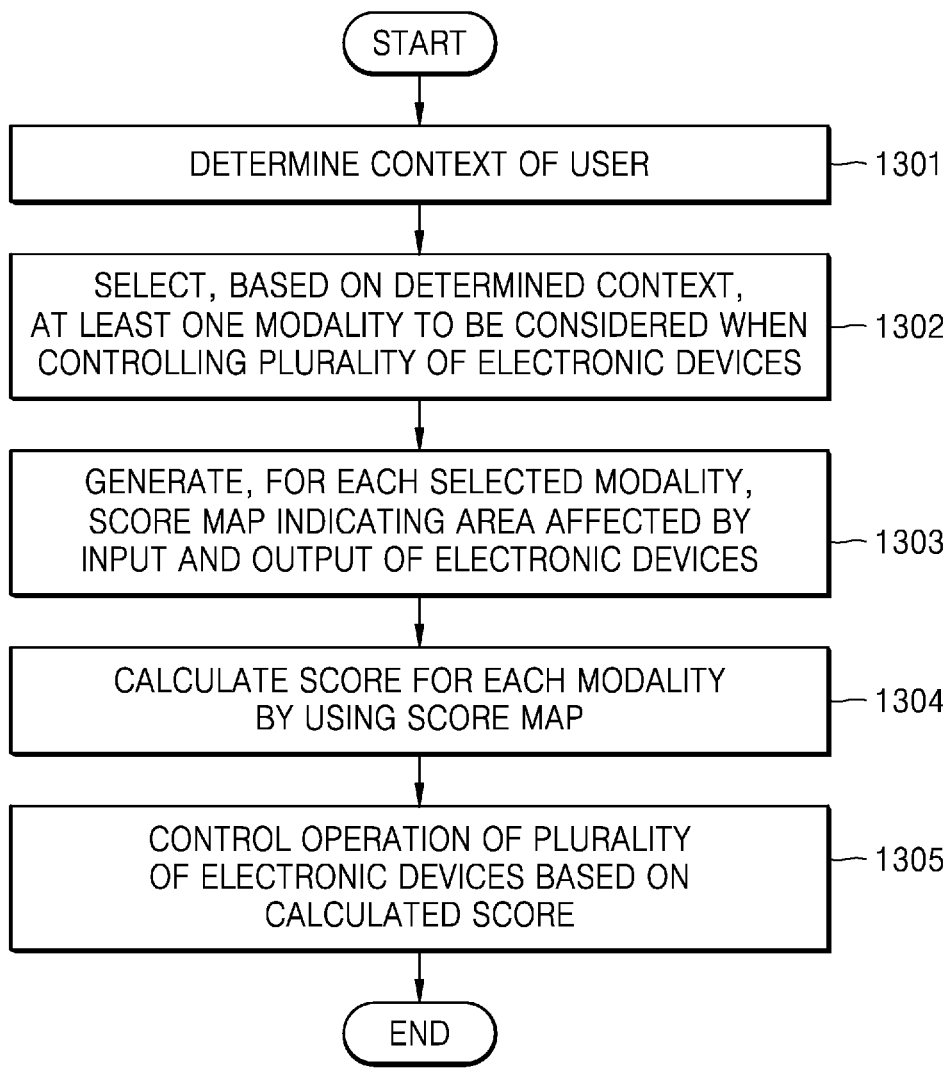
FIGS. 13, 14, 15, and 16 are flowcharts illustrating a method of controlling a plurality of electronic devices according to context of a user, according to various embodiments of the disclosure.
Figure 14:
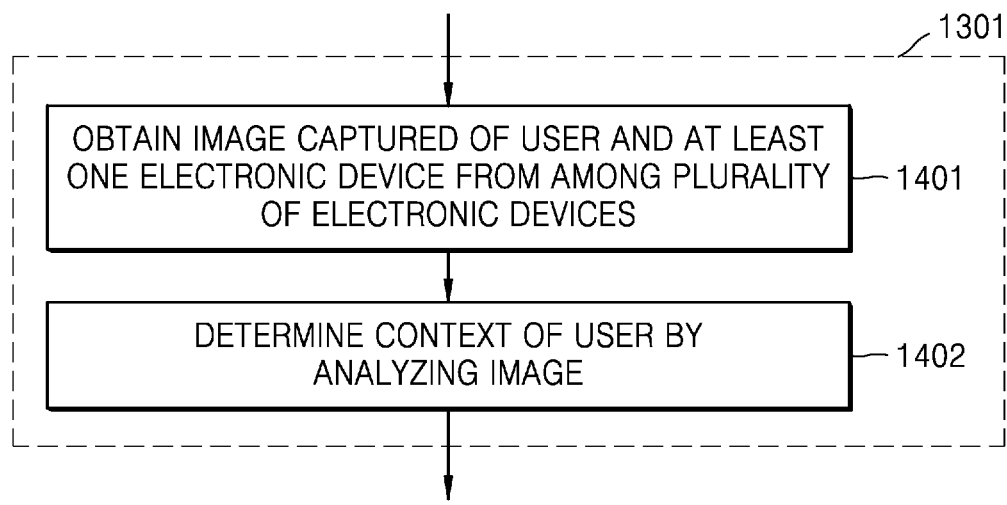

Referring to FIG. 13, in operation 1301, the server 100 may determine context of a user. The flowchart in FIG. 14 includes detailed operations included in operation 1301. Referring to FIG. 14, the server 100 may obtain an image captured of a user and at least one electronic device from among a plurality of electronic devices, in operation 1401, and analyze the image and determine the context of the user, in operation 1402. In addition, the server 100 may use information about an operation status of electronic devices when necessary, and determine the context based on a user's input.

In operation 1302, the server 100 may select, based on the determined context, at least one modality to be considered when controlling the plurality of electronic devices. To this end, information about corresponding modality for each context may be pre-stored in the memory 130 of the server 100.

In operation 1303, the server 100 may generate a score map indicating an area affected by an input and output of the plurality of electronic devices for each selected modality. The server 100 may reflect the context, the selected modality, and input/output characteristics of the electronic devices and display input/output kernels on the map, to generate the score map. On the score map, the user and an input kernel or output kernel for at least one of the plurality of electronic devices may be displayed. Here, the input kernel may indicate a range of an area affected by an input of the user or electronic device, and the output kernel may indicate a range of an area affected by an output of the user or electronic device. In addition, according to an embodiment of the disclosure, the score map may include a plurality of layers, and a location of at least one electronic device may be pre-displayed in some layers.

Figure 15:
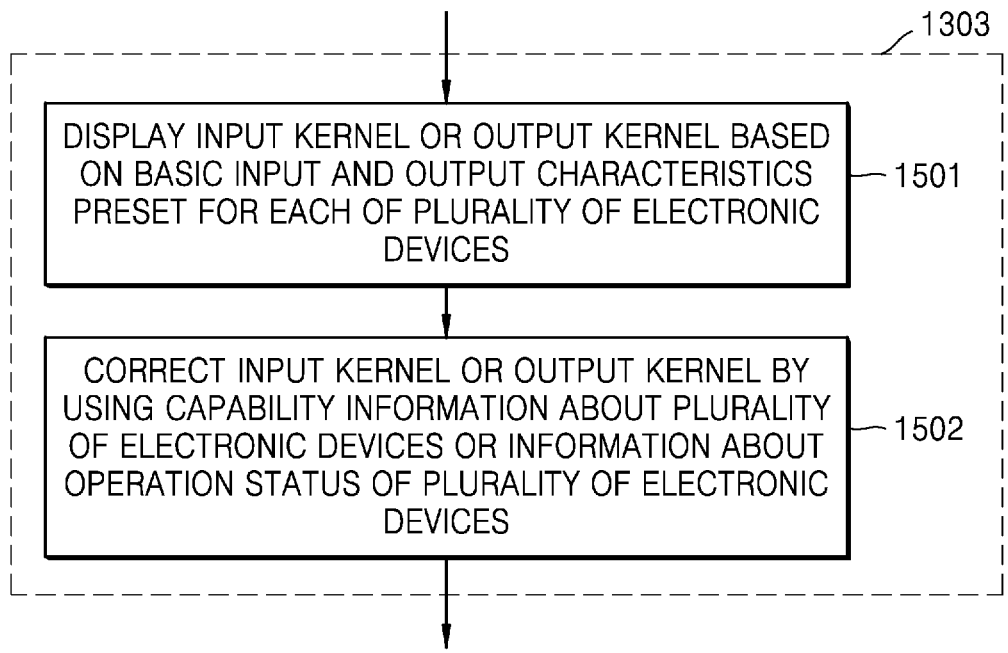
Figure 16:
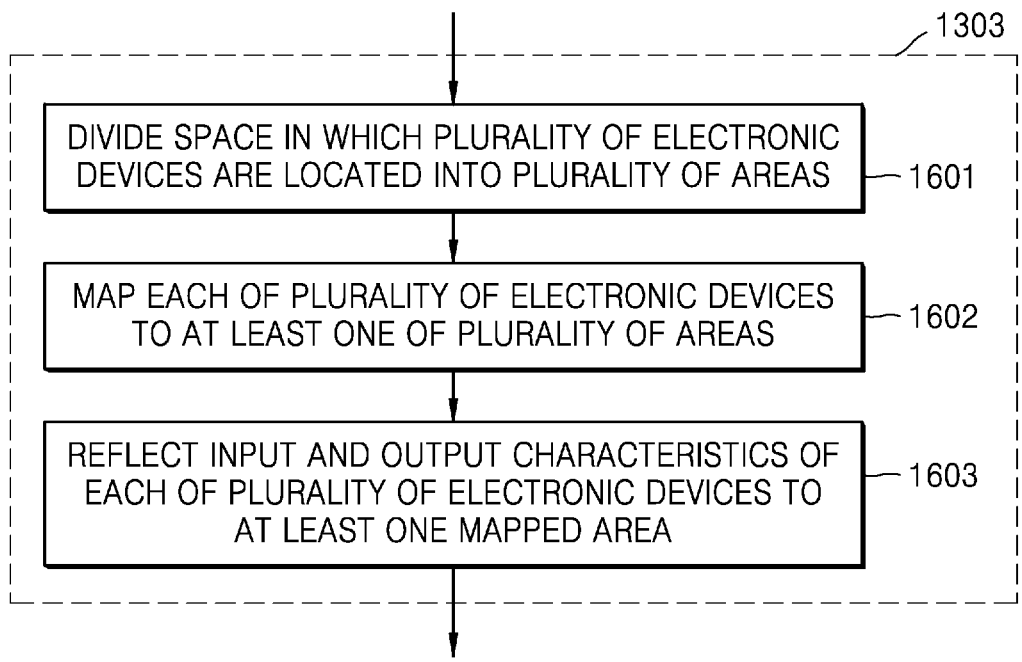

Flowcharts including detailed operations included in operation 1303 are shown in FIGS. 15 and 16, respectively.

Referring to FIG. 15, in operation 1501, the server 100 may display an input kernel or output kernel based on basic input/output characteristics preset for each of the plurality of electronic devices. To this end, information about corresponding basic input/output characteristics for each type of electronic device may be pre-stored in the memory 130 of the server 100.

In operation 1502, the server 100 may correct the input kernel or output kernel by using capability information about the plurality of electronic devices or information about the operation status of the plurality of electronic devices. According to an embodiment of the disclosure, the server 100 may obtain capability information or information about an operation status from the electronic devices, and change at least one of a size or a shape of an input kernel or output kernel based on the capability information or information about the operation status.

Referring to FIG. 16, in operation 1601, the server 100 may divide a space where the plurality of electronic devices are located into a plurality of areas. In operation 1602, the server 100 may map each of the plurality of electronic devices to at least one of the plurality of areas. In operation 1603, the server 100 may generate a score map by reflecting the input/output characteristics of each of the plurality of electronic devices in the at least one mapped area.

Referring again to FIG. 13, in operation 1304, the server 100 may calculate a score for each modality by using the score map. According to an embodiment of the disclosure, the server 100 may calculate the score based on the characteristics of the output kernel and an area of a region in which an input kernel and an output kernel displayed on the score map overlap each other. As described above, the server 100 may calculate the score by adding an area of a region in which an output kernel and an input kernel with positive characteristics overlap each other and subtracting an area of a region in which an output kernel and an input kernel with negative characteristics overlap each other, and in this case, a weight may be reflected depending on the level of the input/output kernel. In addition, according to an embodiment of the disclosure, the server 100 may calculate the score by performing a convolution operation on the input kernel and the output kernel included in the score map.

In operation 1305, the server 100 may control operations of the plurality of electronic devices based on the calculated score. According to an embodiment of the disclosure, the server 100 may control an operation of at least one electronic device from among the plurality of electronic devices such that a score corresponding to the score map increases. Alternatively, according to an embodiment of the disclosure, the server 100 may predict a score after a certain period of time, and control the operations of the electronic devices in a way to increase the predicted score. Alternatively, according to an embodiment of the disclosure, the server 100 may identify the operation of the electronic devices to maximize the score by applying an iterative optimization technique to the score map for each modality, and establish an optimal operation plan, and control the electronic devices to operate according to the plan. (e.g., design a cost function of which the value decreases as the score calculated from the score map increases, and control the electronic devices so that the value of the cost function is minimized)

According to the embodiments described above, a plurality of electronic devices are controlled based on the context determined according to the user's intention, so that an effect of optimizing the user's experience in various situations may be expected.

According to an embodiment of the disclosure, a method of controlling a plurality of electronic devices according to context of a user may include determining, by a computing device, context of the user, selecting, by the computing device based on the determined context, at least one modality to be considered when controlling the plurality of electronic devices, obtaining, by the computing device for each selected modality, a score map indicating an area affected by input and output of the plurality of electronic devices, calculating, by the computing device, a score for each selected modality by using the obtained score map, and controlling, by the computing device, operations of the plurality of electronic devices based on the calculated score, wherein the score may include a value indicating a degree of optimization of user experience in the determined context.

According to an embodiment of the disclosure, an input kernel or output kernel for the user and at least one electronic device from among the plurality of electronic devices may be displayed on the score map, and the input kernel may indicate a range of an area in which an input of the user or electronic device is affected, and the output kernel may indicate a range of an area affected by an output of the user or electronic device.

According to an embodiment of the disclosure, the obtaining of the score map may include displaying the input kernel or output kernel based on basic input and output characteristics preset for each of the plurality of electronic devices, and correcting the input kernel or output kernel by using capability information about the plurality of electronic devices or information about operation status of the plurality of electronic devices.

According to an embodiment of the disclosure, the correcting of the input kernel or output kernel may include obtaining, from the plurality of electronic devices, the capability information or the information about the operation status, and changing at least one of a shape or a size of the input kernel or output kernel based on the capability information or information about the operation status.

According to an embodiment of the disclosure, the obtaining of the score map may include dividing a space in which the plurality of electronic devices are located into a plurality of areas, mapping each of the plurality of electronic devices to at least one of the plurality of areas, and reflecting input and output characteristics of each of the plurality of electronic devices in the at least one mapped area.

According to an embodiment of the disclosure, the calculating of the score may include calculating the score based on characteristics of the output kernel and an area of a region in which an input kernel and an output kernel displayed on the score map overlap each other.

According to an embodiment of the disclosure, the controlling may include controlling an operation of at least one electronic device from among the plurality of electronic devices so that a score corresponding to the score map increase.

According to an embodiment of the disclosure, the score map may include a plurality of layers, and a location of at least one electronic device is pre-displayed in some of the plurality of layers.

According to an embodiment of the disclosure, the determining of the context of the user may include obtaining an image captured of the user and at least one electronic device from among the plurality of electronic devices, and determining the context of the user by analyzing the image.

According to an embodiment of the disclosure, a computing device may include a communication interface configured to perform communication with a plurality of electronic devices, memory configured to store a program for controlling the plurality of electronic devices according to context of a user, and at least one processor, wherein the at least one processor is configured to execute the program to determine the context of the user, select, based on the determined context, at least one modality to be considered when controlling the plurality of electronic devices, obtain, for each selected modality, a score map indicating an area affected by input and output of the plurality of electronic devices, and calculating a score for each selected modality by using the obtained score map, and then controlling operations of the plurality of electronic devices based on the calculated score, and the score may be a value indicating a degree of optimization of user experience in the determined context.

According to an embodiment of the disclosure, an input kernel or output kernel for the user and at least one electronic device from among the plurality of electronic devices may be displayed on the score map, and the input kernel may indicate a range of an area in which an input of the user or electronic device is affected, and the output kernel may indicate a range of an area affected by an output of the user or electronic device.

According to an embodiment of the disclosure, when generating the score map, the at least one processor may be configured to display the input kernel or output kernel based on basic input and output characteristics preset for each of the plurality of electronic device, and then correct the input kernel or output kernel by using capability information about the plurality of electronic devices or information about operation status of the plurality of electronic devices.

According to an embodiment of the disclosure, when correcting the input kernel or output kernel, the at least one processor may be configured to obtain, from the plurality of electronic devices, the capability information or the information about the operation status, and then change at least one of a size or a shape of the input kernel or output kernel based on the capability information or the information about the operation status.

According to an embodiment of the disclosure, when generating the score map, the at least one processor may be further configured to divide a space in which the plurality of electronic devices are located into a plurality of areas, and map each of the plurality of electronic devices to at least one of the plurality of areas, and then reflect input and output characteristics of each of the plurality of electronic devices in the at least one mapped area.

According to an embodiment of the disclosure, when calculating the score, the at least one processor may be configured to calculate the score based on characteristics of the output kernel and an area of a region in which an input kernel and an output kernel displayed on the score map overlap each other.

According to an embodiment of the disclosure, when controlling the operations of the plurality of electronic devices, the at least one processor is configured to control an operation of at least one electronic device from among the plurality of electronic devices so that a score corresponding to the score map increases.

According to an embodiment of the disclosure, the score map may include a plurality of layers, and a location of at least one electronic device is pre-displayed in some of the plurality of layers.

According to an embodiment of the disclosure, when determining the context of the user, the at least one processor may be configured to obtain an image captured of the user and at least one electronic device from among the plurality of electronic devices, and then determining the context of the user by analyzing the image.

Various embodiments of the disclosure may be implemented or supported by one or more computer programs, and the computer programs may be formed from computer-readable program code and stored in a computer-readable medium. In the disclosure, "application" and "program" may refer to one or more computer programs, software components, instruction sets, procedures, functions, objects, classes, instances, related data, or part thereof, suitable for implementation in computer-readable program code. "Computer-readable program code" may include various types of computer code, including source code, object code, and executable code. "Computer-readable medium" may include various types of media that may be accessed by a computer, such as ROM, RAM, hard disk drive (HDD), compact disc (CD), digital video disc (DVD), or various types of memory.

In addition, a machine-readable storage medium may be provided in a form of a non-transitory storage medium. Here, "non-transitory storage medium" is a tangible device and may exclude wired, wireless, optical, or other communication links that transmit transient electrical or other signals. Meanwhile, this "non-transitory storage medium" does not distinguish between cases where data is semi-permanently stored in the storage medium and cases where data is stored temporarily. For example, the "non-transitory storage medium" may include a buffer where data is temporarily stored. A computer-readable medium may be an arbitrary available medium accessible by a computer, and may include all volatile and non-volatile media and separable and non-separable media. Computer-readable media may include media on which data may be permanently stored and media on which data may be stored and later overwritten, such as rewritable optical disks or erasable memory devices.

It will be appreciated that various embodiments of the disclosure according to the claims and description in the specification can be realized in the form of hardware, software or a combination of hardware and software.

Any such software may be stored in a non-transitory computer readable storage medium. The non-transitory computer readable storage medium stores one or more computer programs (software modules), the one or more computer programs comprising instructions, which when executed by one or more processors in an electronic device, cause the electronic device to perform a method of the disclosure.

According to an embodiment of the disclosure, a method according to various embodiments disclosed in the disclosure may be provided by being included in a computer program product. The computer program product is a product that may be traded between a seller and a buyer. The computer program product may be distributed in a form of machine-readable storage medium (for example, a CD-ROM), or distributed (for example, downloaded or uploaded) through an application store or directly or online between two user devices (for example, a smartphone). In the case of online distribution, at least a part of the computer program product (for example, a downloadable application) may be at least temporarily generated or temporarily stored in a machine-readable storage medium, such as a server of a manufacturer, a server of an application store, or memory of a relay server.

The above description of the disclosure is provided for illustration, and it will be understood by one of ordinary skill in the art that various changes in form and details may be readily made therein without departing from essential features and the scope of the disclosure as defined by the following claims. For example, appropriate results may be achieved even when the described techniques are performed in an order different from the described method, or elements, such as systems, structures, devices, devices, circuit, or the like, described by using "and/or" are combined differently from the described method or replaced with other elements or equivalents. Accordingly, the embodiments described above are examples in all aspects and are not limited. For example, each element described as a single type may be implemented in a distributed manner, and similarly, elements described as distributed may be implemented in a combined form.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling a plurality of electronic devices according to a context of a user, the method comprising:
   determining, by a computing device, the context of the user, the context of the user being determined based on activity of the user and an operation status of the plurality of electronic devices;
   selecting, by the computing device based on the determined context, at least one modality to be considered when controlling the plurality of electronic devices, the at least one modality including a type of input and output used when the plurality of electronic devices interact with the user;
   obtaining, by the computing device for each selected modality, a score map indicating an area affected by input and output of the plurality of electronic devices;
   calculating, by the computing device, a score for each selected modality by using the obtained score map; and
   controlling, by the computing device, operations of the plurality of electronic devices based on the calculated score,
   wherein the score is a value indicating a degree of optimization of user experience in the determined context.

2. The method of claim 1,
   wherein an input kernel or output kernel for the user and at least one electronic device from among the plurality of electronic devices is displayed on the score map,
   wherein the input kernel indicates a range of an area in which an input of the user or electronic device is affected, and
   wherein the output kernel indicates a range of an area affected by an output of the user or electronic device.

3. The method of claim 2, wherein the obtaining of the score map comprises:
   displaying the input kernel or output kernel based on basic input and output characteristics preset for each of the plurality of electronic devices; and
   correcting the input kernel or output kernel by using capability information about the plurality of electronic devices or information about operation status of the plurality of electronic devices.

4. The method of claim 3, wherein the correcting of the input kernel or output kernel comprises:
   obtaining, from the plurality of electronic devices, the capability information or the information about the operation status; and
   changing at least one of a shape or a size of the input kernel or output kernel based on the capability information or information about the operation status.

5. The method of claim 1, wherein the obtaining of the score map comprises:
   dividing a space in which the plurality of electronic devices are located into a plurality of areas;
   mapping each of the plurality of electronic devices to at least one of the plurality of areas; and
   reflecting input and output characteristics of each of the plurality of electronic devices in at least one mapped area.

6. The method of claim 1,
   wherein the obtaining of the score map comprises extracting, from an entire score map, a score map corresponding to the selected at least one modality, and
   wherein the entire score map is a map showing all areas affected by the input and output of the plurality of electronic devices for a plurality of modalities.

7. The method of claim 2, wherein the calculating of the score comprises calculating the score based on characteristics of the output kernel and an area of a region in which an input kernel and the output kernel displayed on the score map overlap each other.

8. The method of claim 1, wherein the controlling comprises controlling an operation of at least one electronic device from among the plurality of electronic devices so that a score corresponding to the score map increases.

9. The method of claim 1,
wherein the score map comprises a plurality of layers, and
wherein a location of at least one electronic device is pre-displayed in some of the plurality of layers.

10. The method of claim 1, wherein the determining of the context of the user comprises:
obtaining an image captured of the user and at least one electronic device from among the plurality of electronic devices; and
determining the context of the user by analyzing the image.

11. One or more non-transitory computer-readable storage media storing computer-executable instructions that, when executed by one or more processors of a computing device, cause the computing device to perform operations, the operations comprising:
determining, by the computing device, a context of a user, the context of the user being determined based on activity of the user and an operation status of a plurality of electronic devices;
selecting, by the computing device based on the determined context, at least one modality to be considered when controlling the plurality of electronic devices, the at least one modality including a type of input and output used when the plurality of electronic devices interact with the user;
obtaining, by the computing device for each selected modality, a score map indicating an area affected by input and output of the plurality of electronic devices;
calculating, by the computing device, a score for each selected modality by using the obtained score map; and
controlling, by the computing device, operations of the plurality of electronic devices based on the calculated score,
wherein the score is a value indicating a degree of optimization of user experience in the determined context.

12. A computing device comprising:
a communication interface configured to perform communication with a plurality of electronic devices;
memory; and
one or more processors communicatively coupled to the communication interface and the memory,
wherein the memory store one or more computer programs including computer-executable instructions that, when executed by the one or more processors, cause the computing device to:
execute the program to determine a context of a user, the context of the user being determined based on activity of the user and an operation status of the plurality of electronic devices,
select, based on the context of the user, at least one modality to be considered when controlling the plurality of electronic devices, the at least one modality including a type of input and output used when the plurality of electronic devices interact with the user,
obtain, for each selected modality, a score map indicating an area affected by input and output of the plurality of electronic devices,
calculate a score for each selected modality by using the obtained score map, and
control operations of the plurality of electronic devices based on the calculated score, and
wherein the score is a value indicating a degree of optimization of user experience in the determined context.

13. The computing device of claim 12,
wherein an input kernel or output kernel for the user and at least one electronic device from among the plurality of electronic devices is displayed on the score map, and
wherein the input kernel indicates a range of an area in which an input of the user or electronic device is affected, and the output kernel indicates a range of an area affected by an output of the user or electronic device.

14. The computing device of claim 13, wherein, when obtaining the score map, the one or more computer programs further comprise computer-executable instructions that, when executed by the one or more processors, cause the computing device to:
display the input kernel or output kernel based on basic input and output characteristics preset for each of the plurality of electronic device, and
correct the input kernel or output kernel by using capability information about the plurality of electronic devices or information about operation status of the plurality of electronic devices.

15. The computing device of claim 14, wherein, when correcting the input kernel or output kernel, the one or more computer programs further comprise computer-executable instructions that, when executed by the one or more processors, cause the computing device to:
obtain, from the plurality of electronic devices, the capability information or the information about the operation status, and
change at least one of a size or a shape of the input kernel or output kernel based on the capability information or the information about the operation status.

16. The computing device of claim 12, wherein, when obtaining the score map, the one or more computer programs further comprise computer-executable instructions that, when executed by the one or more processors, cause the computing device to:
divide a space in which the plurality of electronic devices are located into a plurality of areas,
map each of the plurality of electronic devices to at least one of the plurality of areas, and
reflect input and output characteristics of each of the plurality of electronic devices in at least one mapped area.

17. The computing device of claim 13, wherein, when calculating the score, the one or more computer programs further comprise computer-executable instructions that, when executed by the one or more processors, cause the computing device to:
calculate the score based on characteristics of the output kernel and an area of a region in which an input kernel and the output kernel displayed on the score map overlap each other.

18. The computing device of claim 12, wherein, when controlling the operations of the plurality of electronic devices, the one or more computer programs further comprise computer-executable instructions that, when executed by the one or more processors, cause the computing device to:

control an operation of at least one electronic device from among the plurality of electronic devices so that a score corresponding to the score map increases.

19. The computing device of claim 12, wherein the score map comprises a plurality of layers, and wherein a location of at least one electronic device is pre-displayed in some of the plurality of layers.

20. The computing device of claim 12, wherein, when determining the context of the user, the one or more computer programs further comprise computer-executable instructions that, when executed by the one or more processors, cause the computing device to:
obtain an image of the user in an environment with at least one electronic device from among the plurality of electronic devices, and
determine the context of the user by analyzing the image.

* * * * *